United States Patent [19]

Burrows

[11] 4,009,567
[45] Mar. 1, 1977

[54] DELAYED RAMPING IN THE PRIMARY CONTROL SYSTEM OR LOCAL MAINTENANCE CONTROLLER OF A GAS TURBINE IMPLEMENTED ELECTRICAL POWER PLANT

[75] Inventor: Leonard H. Burrows, Gibsonia, Pa.

[73] Assignee: Westinghouse Electric Corporation, Pittsburgh, Pa.

[22] Filed: Feb. 19, 1975

[21] Appl. No.: 551,201

[52] U.S. Cl. .................... 60/39.03; 60/39.28 R; 60/39.14

[51] Int. Cl.² ........................................ F02C 9/08

[58] Field of Search ......... 60/39.28 R, 39.14, 39.03

[56] References Cited

UNITED STATES PATENTS

| | | | |
|---|---|---|---|
| 3,382,671 | 5/1968 | Ehni | 60/39.14 |
| 3,421,317 | 1/1969 | Bedford | 60/39.28 R |
| 3,422,619 | 1/1969 | Hendricks | 60/39.28 R |
| 3,469,395 | 9/1969 | Spitsbergen | 60/39.28 R |
| 3,520,133 | 7/1970 | Loft | 60/39.28 R |
| 3,691,759 | 9/1972 | Scheerer | 60/39.28 R |
| 3,729,929 | 5/1973 | Kiscaden | 60/39.28 R |
| 3,834,361 | 9/1974 | Keely | 60/39.28 R |

Primary Examiner—Clarence R. Gordon
Attorney, Agent, or Firm—E. F. Possessky

[57] ABSTRACT

A predetermined time delay of speed setpoint ramping of a gas turbine is imposed at ignition in its primary control system or local maintenance controller in order to compensate for the fixed energy input at ignition which might otherwise greatly increase the possibility of flameout. The imposed time delay results in the increase of an initial turbine speed tracking mode time period for the duration of the time delay.

During the time delay period, fuel flow is maintained at a fixed fuel valve setting and pressure. At the termination of the time delay period, ramping of a speed setpoint at a selected rate is begun and the turbine speed is thereby increased towards synchronization speed whereat synchronization is effected.

7 Claims, 50 Drawing Figures

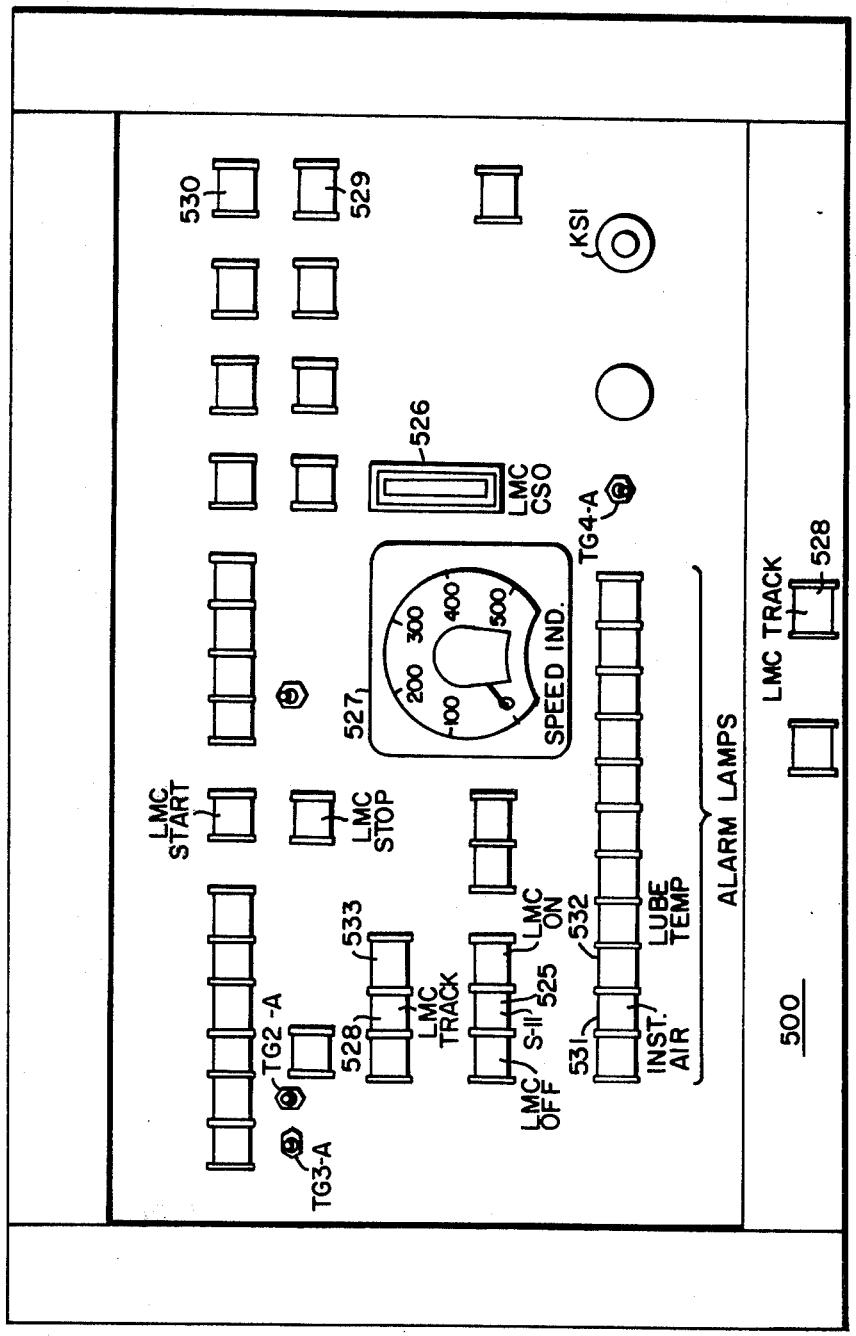

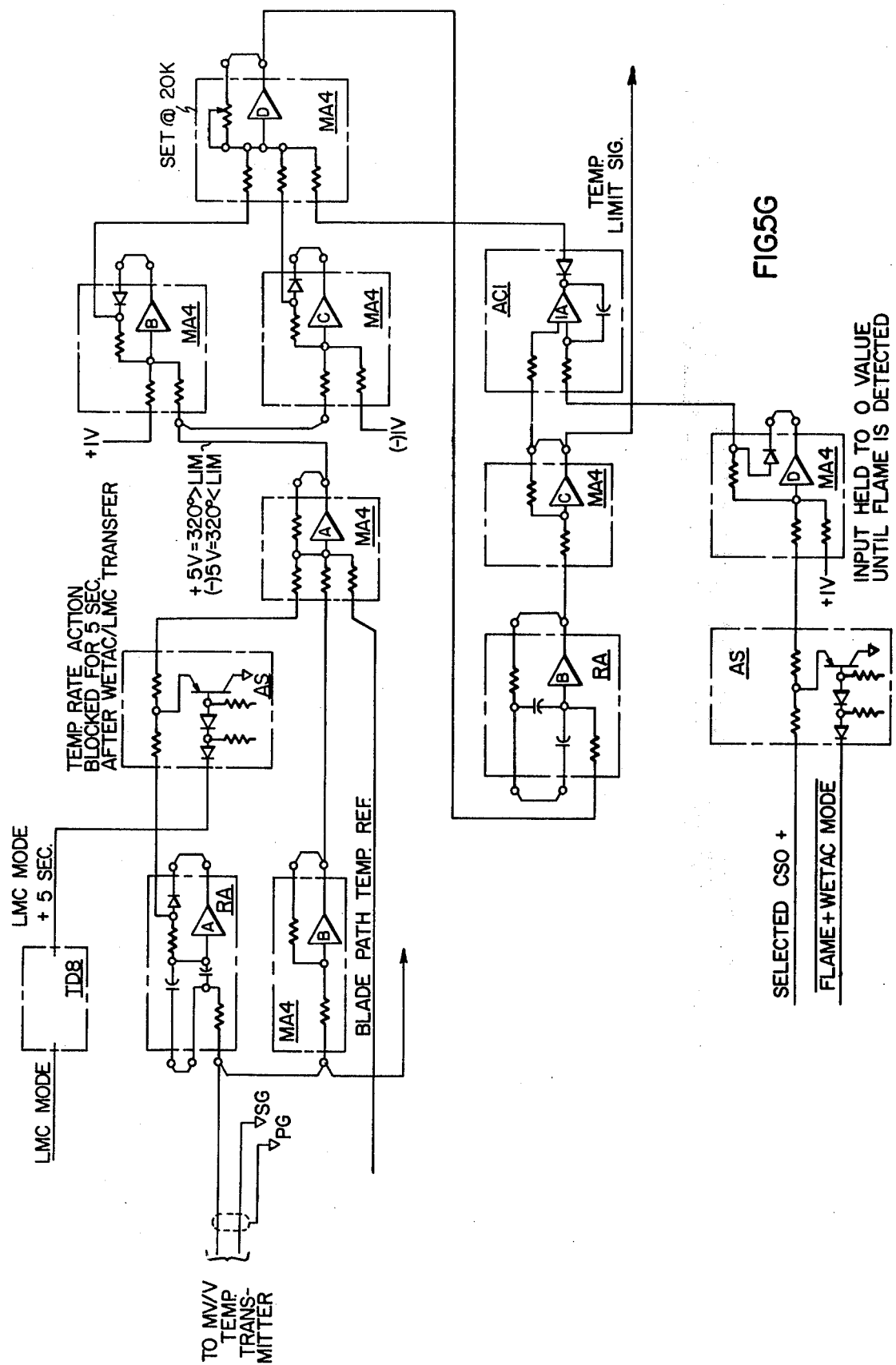

(±)10V. REFERENCE & SPEED
SET POINT DEVELOPMENT

BLADE PATH TEMP. REFERENCE DEVELOPMENT

RUN FUNCTION OBTAINED BY VOLTAGE ADDITION TO START FUNCTION.
ANALOG SW. 2F GROUNDS B AMPL. OUTPUT WITH BKR. OPEN.

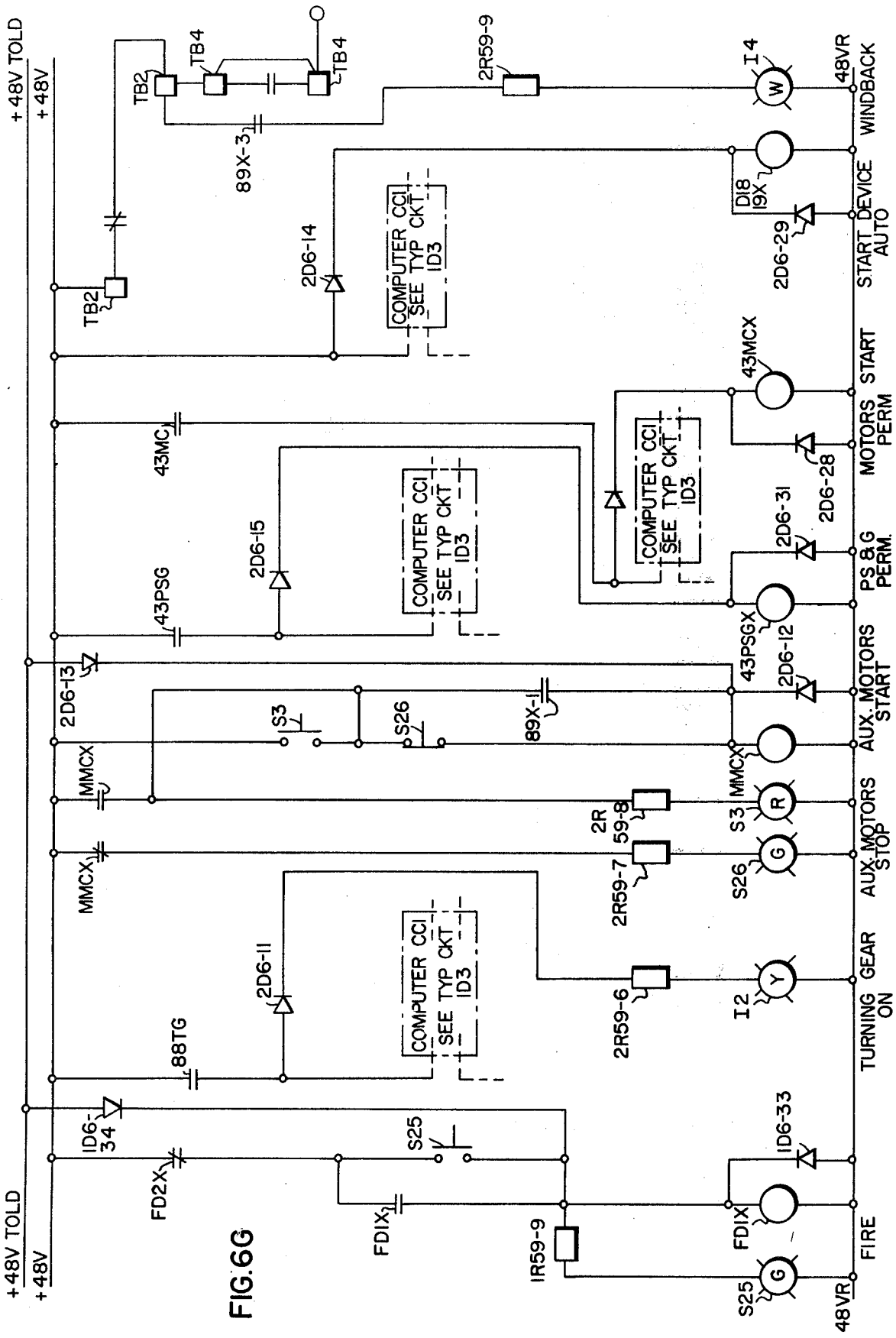

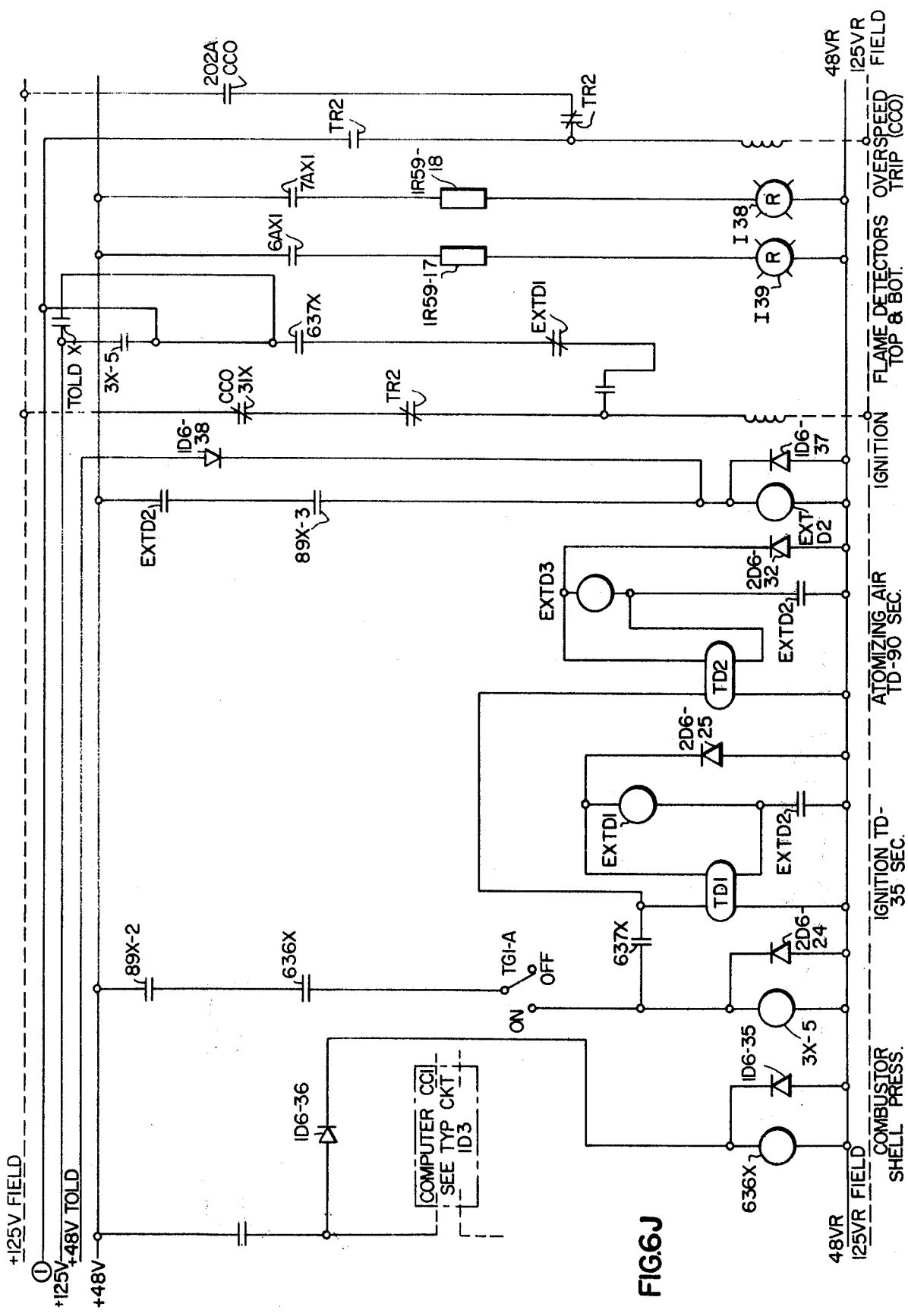

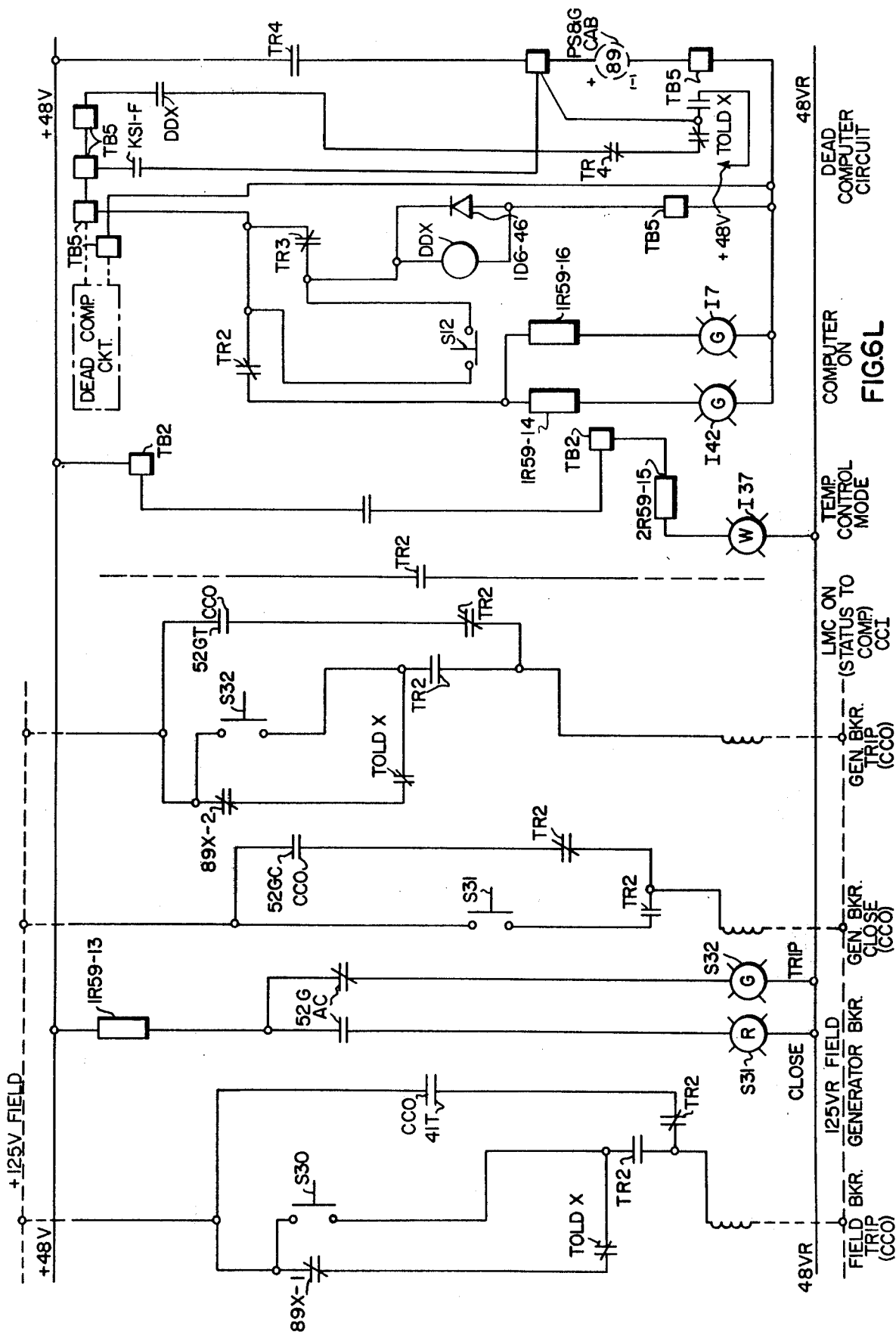

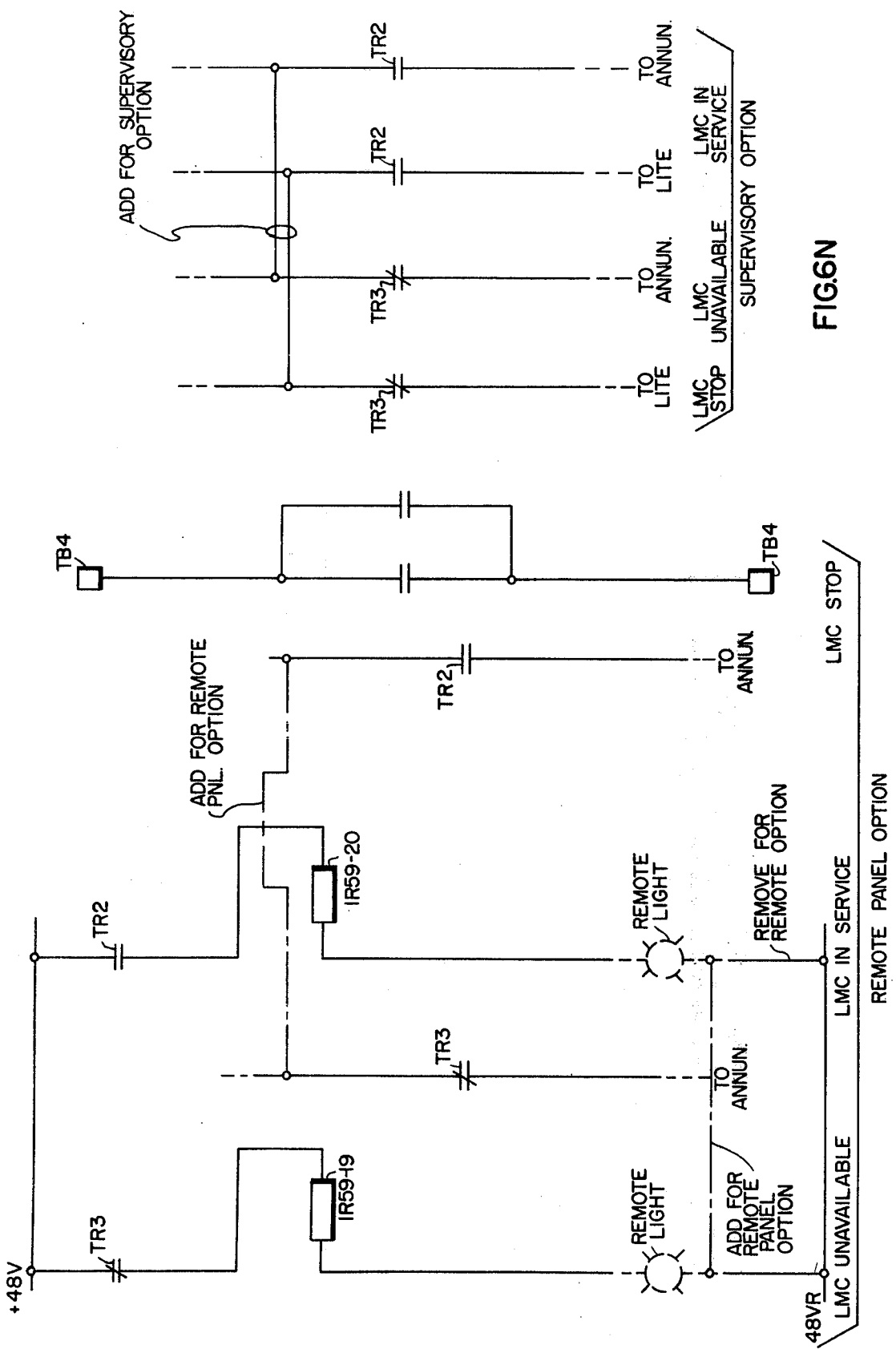

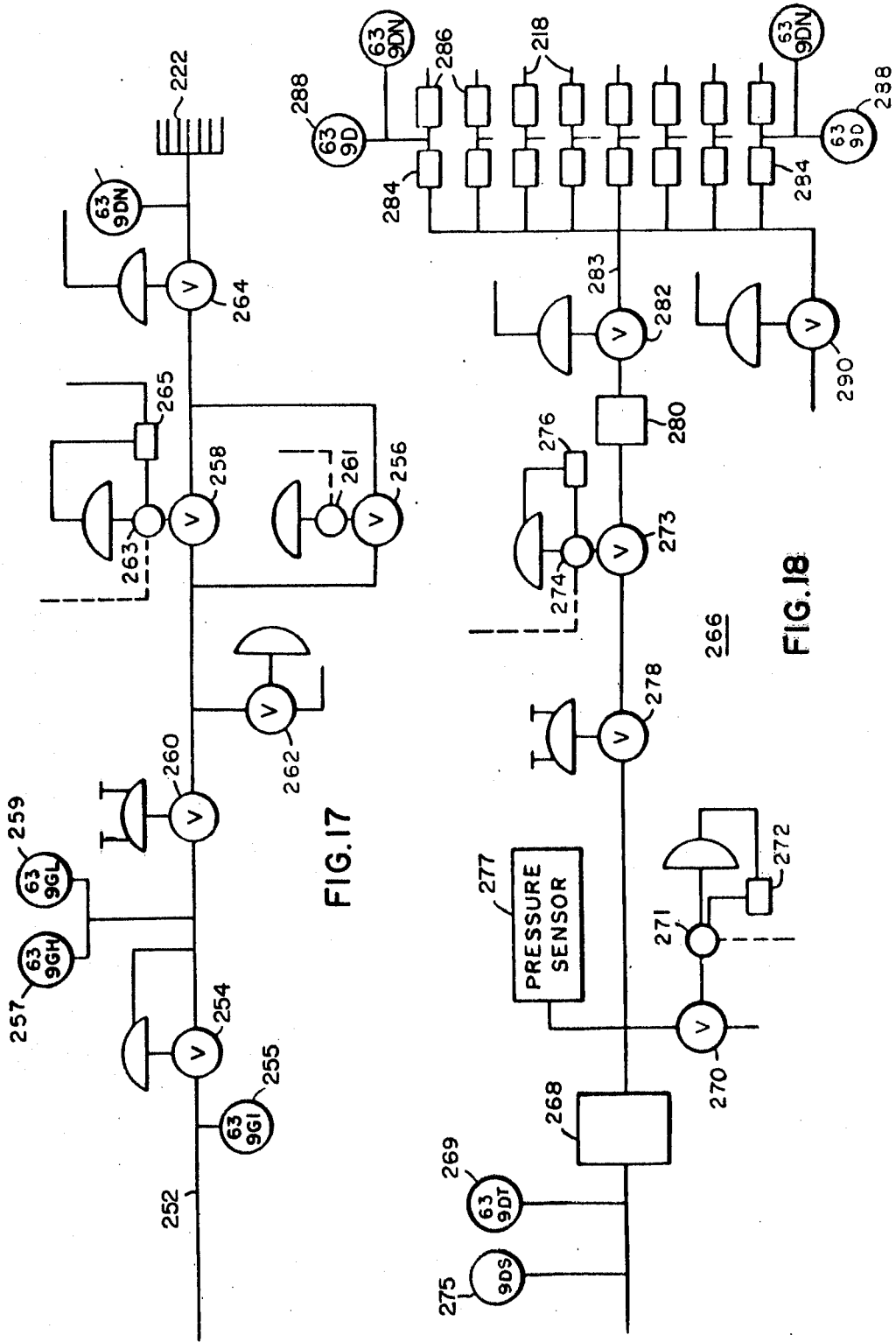

DELAYED RAMPING IN THE PRIMARY CONTROL SYSTEM OR LOCAL MAINTENANCE CONTROLLER OF A GAS TURBINE IMPLEMENTED ELECTRICAL POWER PLANT

CROSS-REFERENCE TO RELATED APPLICATIONS

Reference is hereby made to the following copending and related applications, all of which are assigned to the present assignee:

U.S. patent application Ser. No. 476,182 filed on June 4, 1974 in the names of Smith et al., entitled "Local Maintenance Controller For Gas Turbine Power Plants Having A Primary Control System," which application is incorporated herein by reference;

U.S. patent application Ser. No. 82,470 filed on Oct. 20, 1970 in the names of J. Reuther and T. Giras, entitled "System And Method For Operating Industrial Gas Turbine Apparatus And Gas Turbine Electric Power Plants Preferably With a Digital Computer Control System," now abandoned in favor of U.S. patent application Ser. No. 319,114, filed on Dec. 29, 1972 as a streamline continuation thereof;

U.S. patent application Ser. No. 82,469 filed on Oct. 20, 1970 in the names of R. Kiscaden and R. Yannone, entitled "System And Method For Accelerating And Sequencing Industrial Gas Turbine Apparatus And Gas Turbine Electric Power Plants Preferably With A Digital Computer Control System," now abandoned in favor of U.S. patent application Ser. No. 252,948, filed on May 12, 1972 as a streamline continuation thereof, and U.S. patent application Ser. No. 252,131, filed on May 10, 1972 as a divisional of the originally filed, above-mentioned, U.S. patent application Ser. No. 82,469;

U.S. patent application Ser. No. 82,467 filed on Oct. 20, 1970, now U.S. Pat. No. 3,898,439, in the name of T. Reed, entitled "Improved System And Method For Operating Industrial Turbine Apparatus And Gas Turbine Electric Power Plants Preferably With A Digital Computer Control System;"

U.S. patent application Ser. No. 99,491 filed on Dec. 18, 1970 in the name of J. Reuther, entitled "System And Method Employing A Digital Computer For Automatically Synchronizing A Gas Turbine Or Other Electric Power Plant Generator With A Power System," now abandoned in favor of U.S. patent application Ser. No. 276,508, filed on July 31, 1972 as a streamline continuation thereof;

U.S. patent application Ser. No. 99,493 filed on Dec. 18, 1970 in the name of T. Reed, entitled "System And Method Employing A Digital Computer With Improved Programmed Operation For Automatically Synchronizing A Gas Turbine Or Other Electric Power Plant Generator With A Power System," now abandoned in favor of U.S. patent application Ser. No. 276,343, filed on July 31, 1972 as a streamline continuation thereof;

U.S. patent application Ser. No. 205,261 filed on Dec. 6, 1971 in the names of R. Yannone and R. Kiscaden, entitled "Improved Control System And Method For Controlling Dual Fuel Operation Of Industrial Gas Turbine Power Plants Preferably Employing A Digital Computer," now abandoned in favor of U.S. patent application Ser. No. 310,520, filed on Nov. 29, 1972, now U.S. Pat. No. 3,866,108, as a streamline continuation thereof;

U.S. patent application Ser. No. 205,263 filed on Dec. 6, 1971 in the name of J. Reuther, entitled "Industrial Gas Turbine Power Plant Control System Having Capability For Effecting Automatic Fuel Transfer Under Load Preferably Employing A Digital Computer," now abandoned in favor of U.S. patent application Ser. No. 308,892, filed on Nov. 22, 1972, now U.S. Pat. No. 3,919,623, as a streamline continuation thereof;

U.S. patent application Ser. No. 155,905 filed on June 23, 1971 in the names of R. Yannone and T. Reed, entitled "Improved System And Method For Monitoring And Controlling Operation of Industrial Gas Turbine Apparatus And Gas Turbine Electric Power Plants Preferably With A Digital Computer Control System," now abandoned in favor of U.S. patent application No. 317,839, filed on Dec. 26, 1972 as a streamline continuation thereof;

U.S. patent application No. 189,632 filed on Oct. 15, 1971 in the names of R. Yannone and R. Kiscaden, entitled "Improved Digital Computer Control System And Method For Monitoring And Controlling Operation Of Industrial Gas Turbine Apparatus To Drive Simultaneously An Electric Power Plant Generator And Provide Exhaust Gases To An Industrial Process," now abandoned in favor of U.S. patent application Ser. No. 323,593, filed on Jan. 15, 1973, now U.S. Pat. No. 3,891,915, as a streamline continuation thereof;

U.S. patent application Ser. No. 189,633 filed on Oct. 15, 1971 in the names of J. Reuther and T. Reed, entitled "Improved Digital Computer Control System And Method For Monitoring And Controlling Operation of Industrial Gas Turbine Apparatus Employing Expanded Parameteric Control Algorithm," now abandoned in favor of U.S. patent application Ser. No. 326,718, filed on Jan 26, 1973, now U.S. Pat. No. 3,866,109, as a streamline continuation thereof; and U.S. patent application Ser. No. 204,944 filed on Dec. 6, 1971 in the name of G. Rankin, entitled "Industrial Gas Turbine Power Plant Control System And Method For Implementing Improved Dual Fuel Scheduling Algorithm Permitting Automatic Fuel Transfer Under Load," now abandoned in favor of U.S. patent application Ser. No. 332,457, filed on Feb. 14, 1973, now U.S. Pat. No. 3,875,380, as a streamline continuation thereof.

Reference is also made to the following related, copending and commonly filed and assigned applications, all of which are hereby incorporated by reference:

U.S. patent application Ser. No. 551,202 filed in the names of Jack R. Smith and Leonard H. Burrows, entitled "Matching Response of a Blade Path Temperature Limit Signal to Characteristics of a Gas Turbine;"

U.S. patent application Ser. No. 551,204 filed in the names of Jack R. Smith and Leonard H. Burrows, entitled "Time Delayed Relay Sequencer and Alarm Reset for a Gas Turbine Local Maintenance Controller;" and U.S. patent application Ser. No. 551,203 filed in the name of Richard S. Heiser, entitled "Bumpless Transfer in Shifting Control Command Between the Primary and Backup Control Systems of a Gas Turbine Power Plant."

BACKGROUND OF THE INVENTION

The present invention relates to the control of a gas turbine power plant and, more particularly, to means for controlling turbine acceleration in a manner which substantially decreases the possibility of flameout. The present invention is equally suitable for employment in the primary control system of a gas turbine implemented power plant or in a local maintenance or backup controller therefor.

In the local maintenance controller described in the above-referenced U.S. Pat. application No. 476,182, or in the primary control system for a gas turbine implemented power plant described in the above-referenced U.S. patent application No. 82,470, ignition is accomplished in the turbine combustor as a result of a fixed energy input. More specifically, fuel flow for ignition purposes is initiated at a fixed fuel valve minimum setting and pressure. This fixed energy input at ignition results in a quantum jump in turbine speed at ignition.

With a turbine control system of the types referenced above, i.e., the control system develops a fuel quantity control or demand signal output (or CSO) which is initially speed dependent through at least ignition, the CSO would be negative or call for a fuel valve position which is less than its fixed minimum position at ignition. As a result increased fuel delivery and acceleration of the turbine will not commence until the speed reference signal catches up with turbine speed. The length of time required for this to happen is often undeterminable and a function of ambient conditions.

However, it may happen that with a given set of ambient comditions, the period in which the CSO is negative may exceed the period of atomizing air time, the period of time in which the supply of air for fuel atomizing purposes will be exhausted. When this occurs, flameout or ignition failure can and often will result.

Consequently, there exists a specific need to provide a means of avoiding flameout in gas turbine control systems which employ a fixed energy ignition input or in which ignition occurs at a fixed, minimum fuel valve setting coupled with an initial speed tracking mode of operation through at least the ignition stage.

SUMMARY OF THE INVENTION

Accordingly, there is provided means for avoiding or significantly reducing the possibility of flameout inherent in gas turbine control systems of the types described above. Specifically, in the context of such control systems, time delay means are utilized to extend an initial speed tracking mode past ignition for a predetermined period which is of sufficient length to accommodate the worst set of ambient conditions which would result in flameout, but is less than the period of time over which atomizing air for ignition purposes can be sustained.

In the present invention, "flame" or "ignition" signal, which is indicative of the achievement of ignition, is fed as one of several inputs to a logic gate which serves in an intermediary role to initiate turbine acceleration. This "flame" signal is delayed by appropriate means for a predetermined period of time. Thus, the logic gate in question, does not "see" the "flame" input signal thereto until after ignition has been sensed and the delay period has expired. This allows the speed reference signal to catch up to the actual turbine speed prior to acceleration of the turbine to synchronous speed.

BRIEF DESCRIPTION OF THE DRAWINGS

FIG. 3 shows a top view of the local maintenance controller operator's panel;

FIGS. 5A–L illustrate a schematic and functional diagram of one embodiment of a dual fuel analog control system of the local maintenance controller shown in FIG. 2;

FIGS. 17 and 18 respectively illustrate schematic diagrams of the gas and liquid fuel supply systems employed with the gas turbine shown in FIG. 11.

DESCRIPTION OF THE PREFERRED EMBODIMENT

The Gas Turbine Power Plant And The Primary Control System

Figure 9:
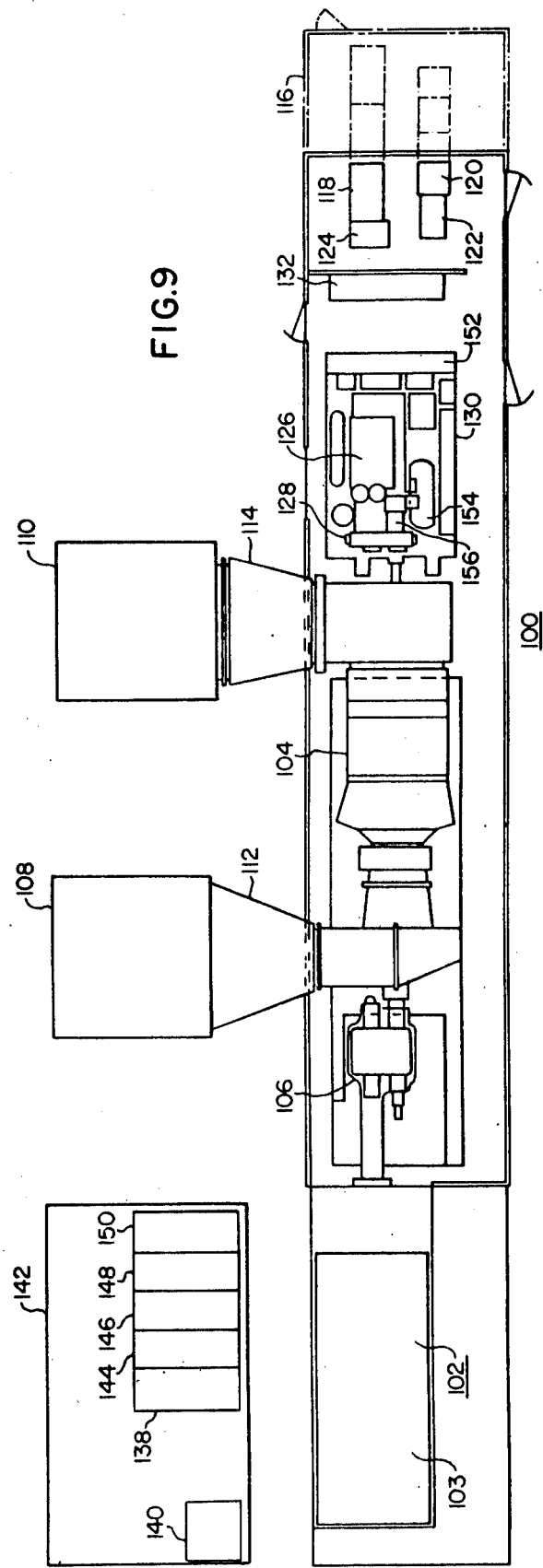
FIG. 9 shows a top plan view of a gas turbine power plant.

The gas turbine power plant and the hybrid analog/digital control system therefor is completely described in U.S. patent application Ser. No. 82,470, shafts is hereby incorporated herein by reference. More particularly, there is shown in FIG. 9, a gas turbine electric power plant 100 which includes an AC generator 102 driven by a combustion or gas turbine 104 through a reduction gear unit 106. In this instance, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shats or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristically associated with turbine power plants.

Digital computer and other control systems circuitry in a cabinet 118 provides for operation of the power plant 100 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor load, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

Figure 10:
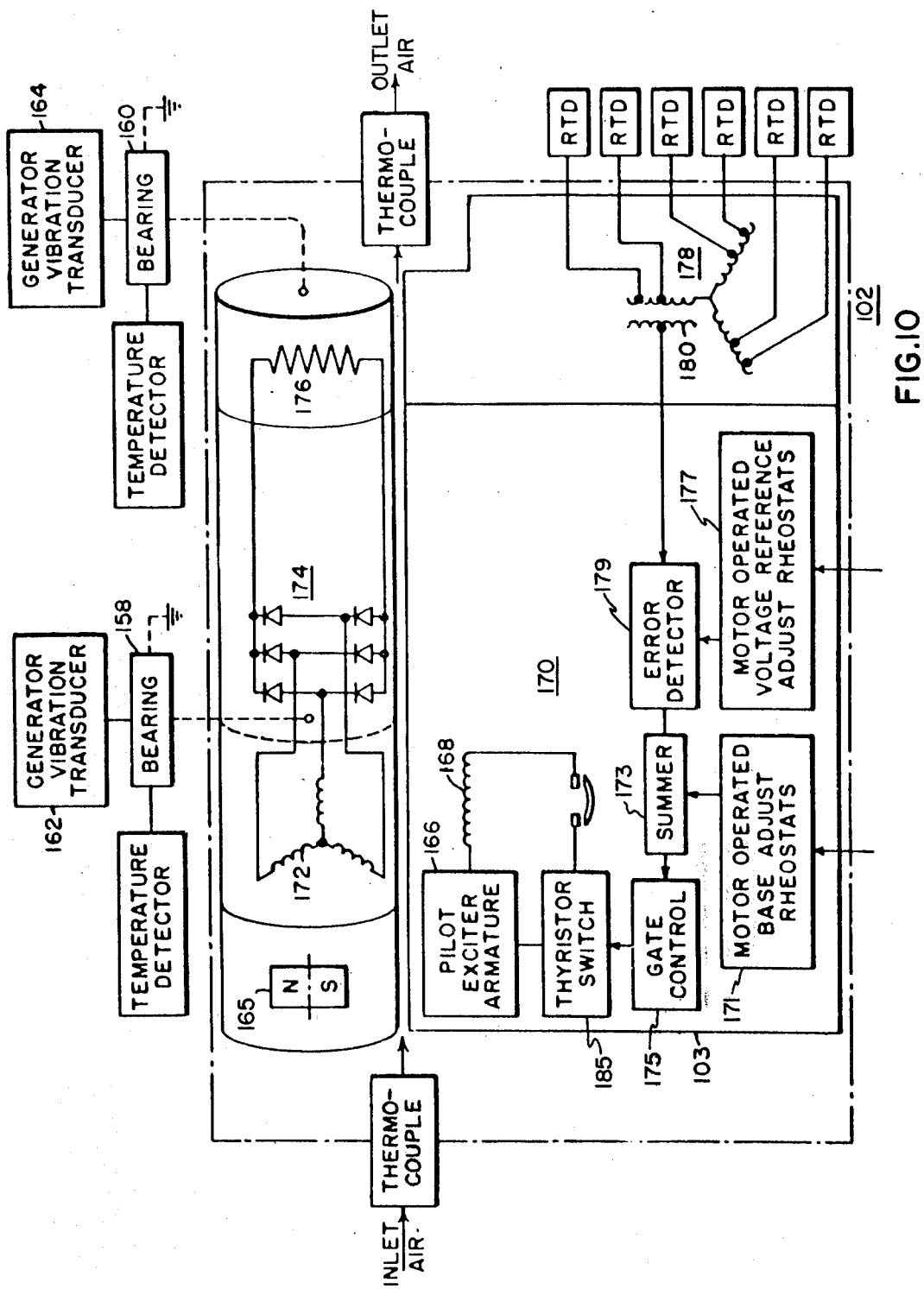
FIG. 10 shows a schematic view of a rotating rectifier exciter and a generator employed in the gas turbine power plant of FIG. 9.

The generator 102 and its brushless exciter 103 are schematically illustrated in greater detail in FIG. 10. Structural details as well as details of operation are considered more fully in the aforementioned copending U.S. application Ser. No. 82,470, Section A2, pages 21 to 24.

Briefly, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

Figure 11:
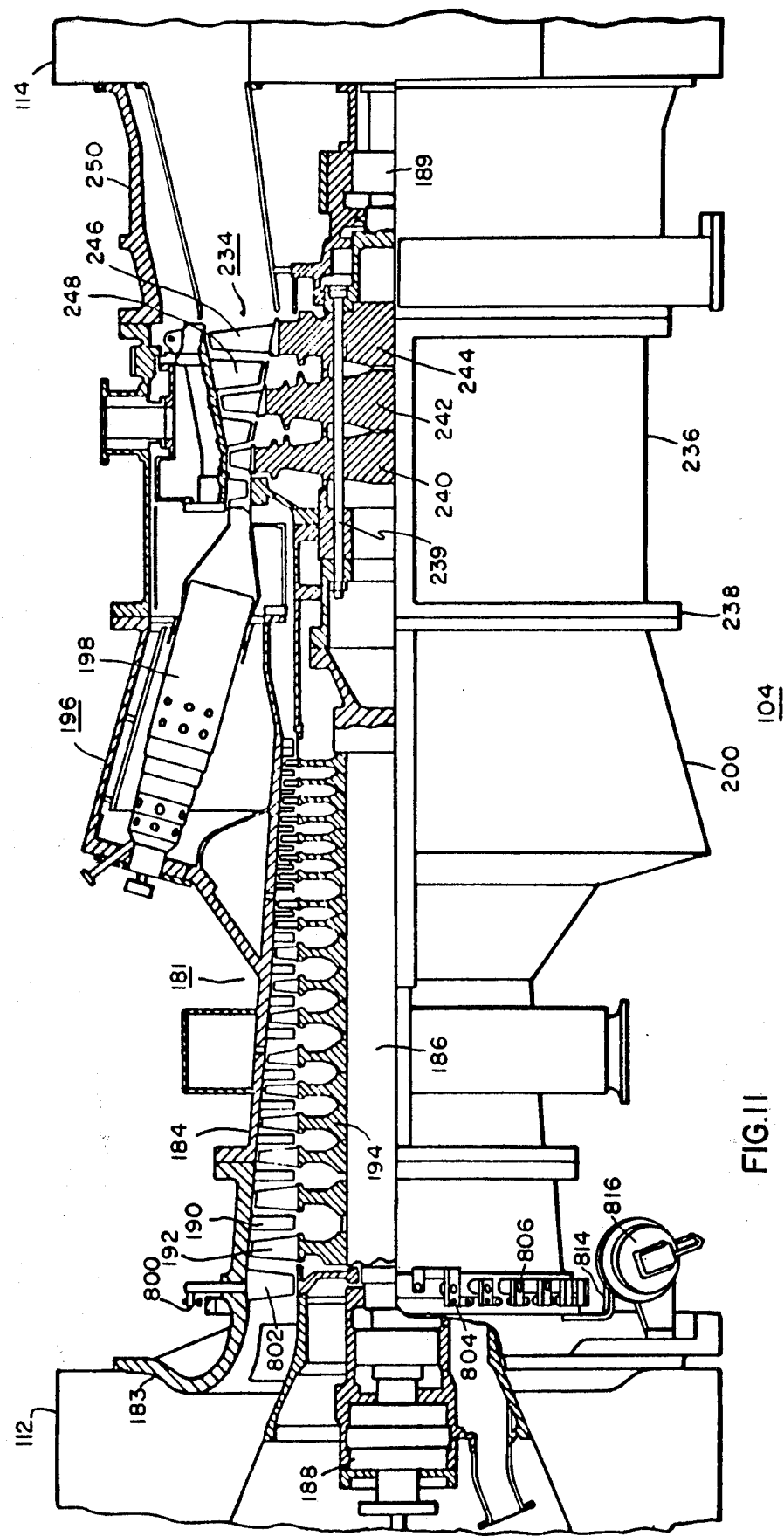
FIG. 11 shows a front elevational view of an industrial gas turbine employed in the power plant of FIG. 9 and is shown with some portions thereof broken away.

The gas turbine 104 in this case is the single shaft simple cycle type having a standard ambient pressure ratio of 9.0 to 1 and rated speed of 4,894 rpm and it is illustrated in greater detail in FIG. 11. Filtered inlet air enters a multistate axial flow compressor 181 through a flanged inlet manifold 183 from the inlet ductwork 112. An inlet guide vane assembly 800 includes rotatably mounted variable inlet guide vanes 802 circumferentially spaced about the compressor inlet. The vanes 802 are mechanically coupled to a pneumatically operated positioning ring 804 by a plurality of link assemblies 806. The angle 808 at which the guide vanes 802 are disposed in relation to the air stream is uniform, having been positioning in response to the synchronous uniform movement of the link assemblies 806 occasioned by angular displacement of the positioning ring 804. Rotations of the positioning ring 804 are in response to a computer generated electrical signal which is transformed into a pneumatic signal by an inlet guide vane transducer (not shown). The pneumatic signal subsequently operates an inlet guide vane actuator piston contained in the air cylinder actuator 816, which delivers a force to an actuator bracket 814 sufficient to displace the positioning ring by the desired amount.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples.

Pressurized compressor outlet air is directed into a combustion system 196 comprising a total of eight combustor baskets 198 conically mounted witin a section 200 of the casing 184 about the longitudinal axis of the gas turbine 104. Combustor shell pressure is detected by a suitable sensor coupled to the compressor-combustor flow paths located in the pressure switch and gauge cabinet 152.

Figure 13:
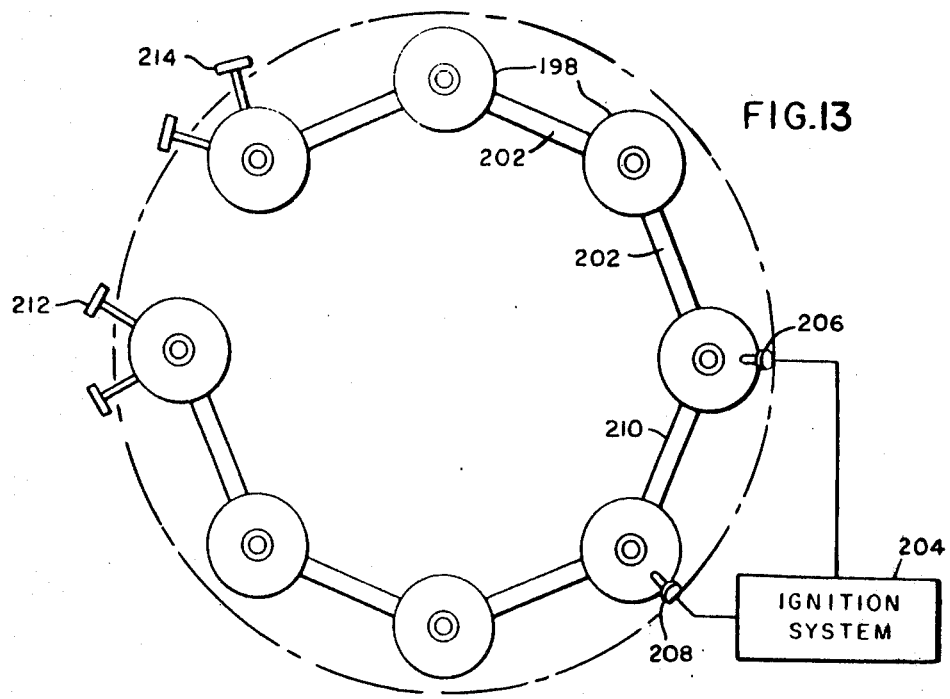
FIGS. 13–15 depict a fuel nozzle and parts thereof as employed in the gas turbine shown in FIG. 11.

As schematically illustrated in FIG. 13, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 are associated with each of the end combustor baskets in the respective basket groups in order to verify ignition and continued presence of combustion in the eight combustor baskets 198. The flame detectors 212 can for example be Edison flame detectors Model 424–10433.

In FIG. 17 there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle 222 is disposed about the atomizing air nozzle 220 to complete the assembly of the fuel nozzle 216.

Figure 15:
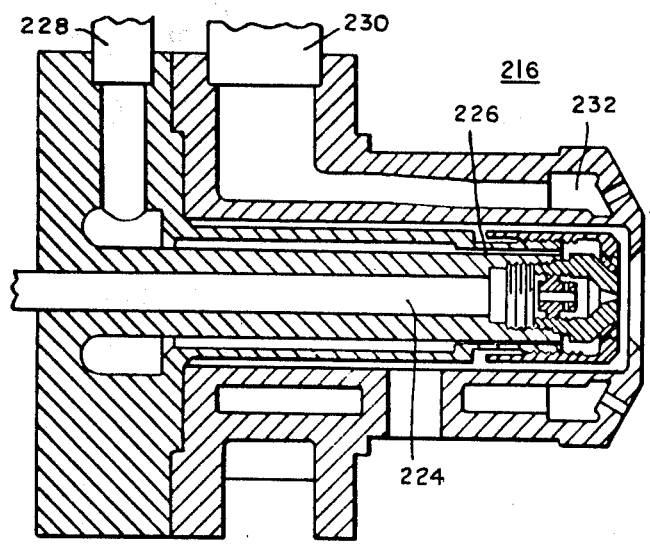
Figure 14:
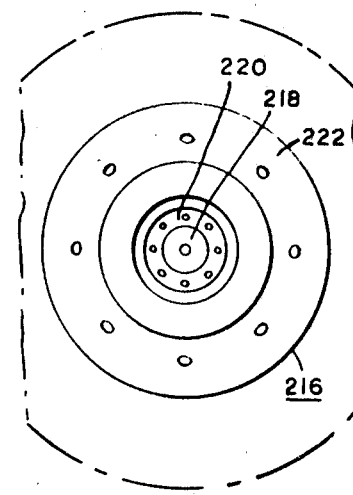
Figure 16A:
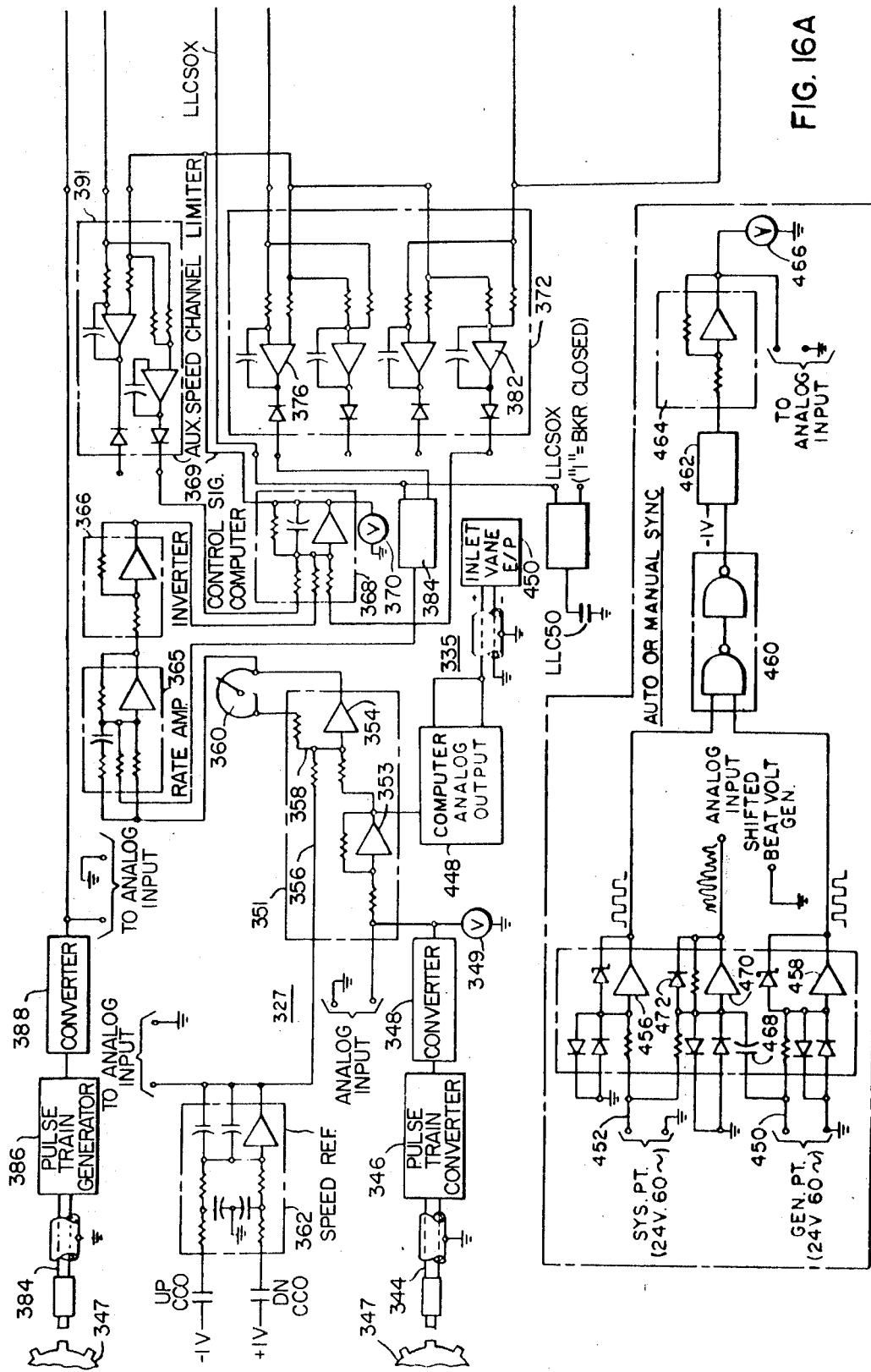
FIGS. 16A–B illustrate schematically the analog circuitry associated with the computer and the primary control system, which circuitry provides control over the gas turbine fuel supply system operation and certain other plant functions.
Figure 16B:
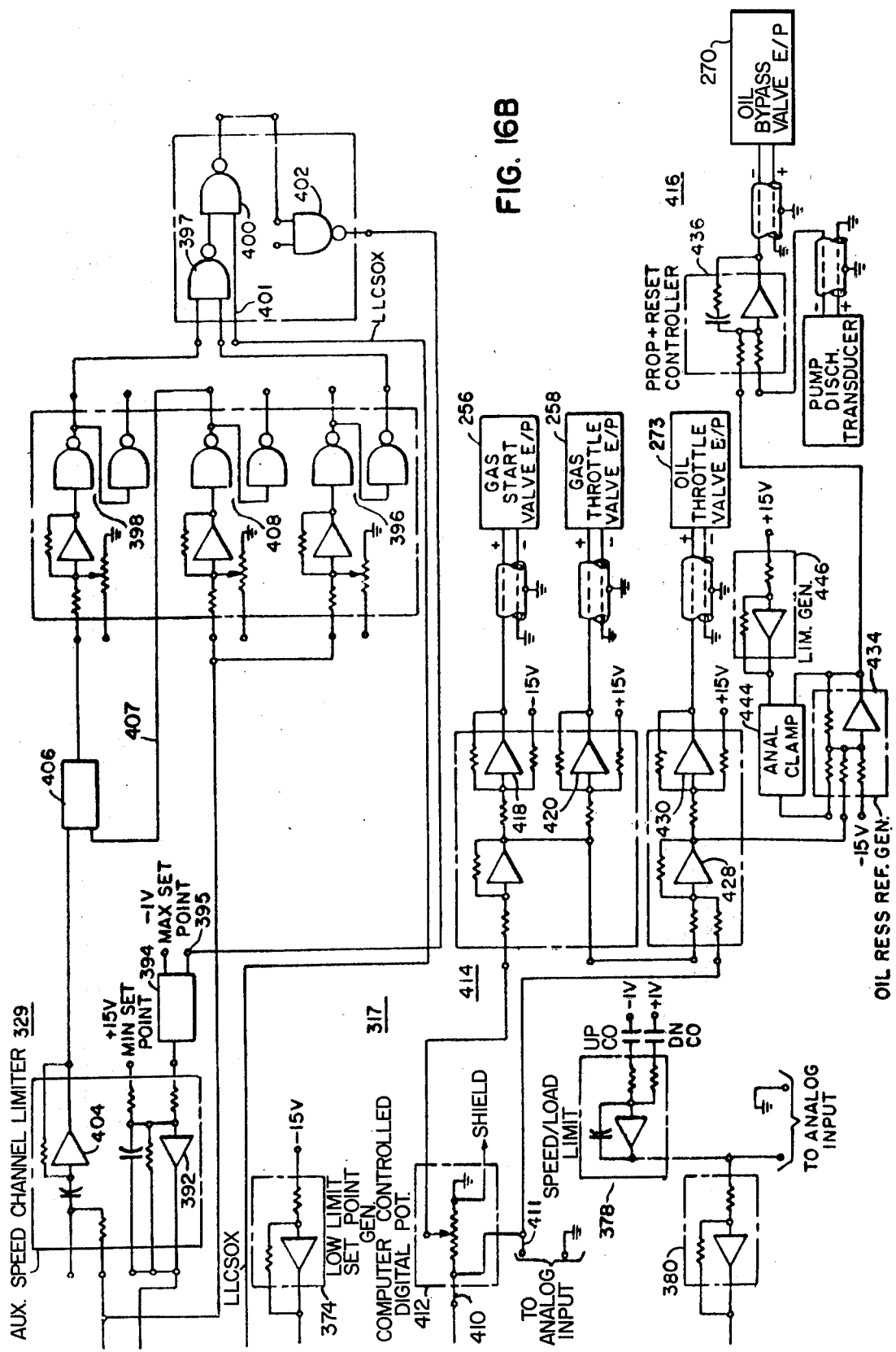

As indicated in the broken away side view in FIG. 15, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 100 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234. The combustor casing section 200 is coupled to a turbine casing 236 through a vertical casing joint 238. No high pressure air or oil seal is required between the compressor 181 and the turbine 234.

The turbine 234 is provided with three reaction stages through which the multiple stream combustion system outlet gas flow is directed in an annular flow pattern to transform the kinetic energy of the heated, pressurized gas into turbine rotation, i.e., to drive the compressor 181 and the generator 102. The turbine rotor is formed by a stub shaft 239 and three disc blade assemblies 240, 242 and 244 mounted on the stub shaft by through bolts. Thermocouples are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers can be conventional velocity transducers or pickups which transmit basic vibration signals to a vibration monitor for input to the control system. A pair of conventional speed detectors are associated with a notched magnetic wheel supported at appropriate turbine-generator shaft locations. Signals generated by the speed detectors are employed in the control system in determining power plant operation.

Thermocouples are associated with the gas turbine bearing oil drains. Further, thermocouples for the blade path are supported about the inner periphery of the exhaust manifold 250 to provide a fast response indication of blade temperature for control system usage particularly during plant startup periods. Exhaust temperature detectors are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

A fuel system 251 is provided for delivering gaseous fuel to the gas nozzles 222 under controlled fuel valve operation as schematically illustrated in FIG. 17. Gas is transmitted to a diaphragm operated pressure regulating valve 254 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard C37/2–1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10 to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152. A pressure switch 267 indicates fuel pressure at the inlet to the nozzles 222.

As schematically shown in FIG. 18, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 269. A bypass valve 271 is pneumatically operated by an electropneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzle 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valves provides on/off control of liquid fuel to a liquid manifold 283.

Eight positive displacement pumps 284 are respectively disposed in the individual fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. A manifold drain valve 290 is pneumatically operated under electric signal control during turbine shutdown to drain any liquid fuel remaining in the manifold 283.

Details concerning plant performance characteristics are contained in the aforementioned, related U.S. patent application Ser. No. 82,470, Section A4, pages 32 to 36.

The preferred embodiment of the integrated turbine generator control system 300 (FIG. 12) employs analog digital computer circuitry to provide sequenced start-stop plant operation, monitoring and alarm functions for plant protection and accurately, reliably and efficiently performing speed/load control during plant startup, running operation and shutdown. The plant control system 300 is characterized with centralized system packaging having a single operator's panel and embracing elements disposed in the control cabinet 118, the pressure switch and gauge cabinet 152 and other elements included in the electric power plant 100 of FIG. 9. If multiple plants like the power plant 100 are to be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be unattended and operated by direct wired remote or supervisory control.

Figure 8:
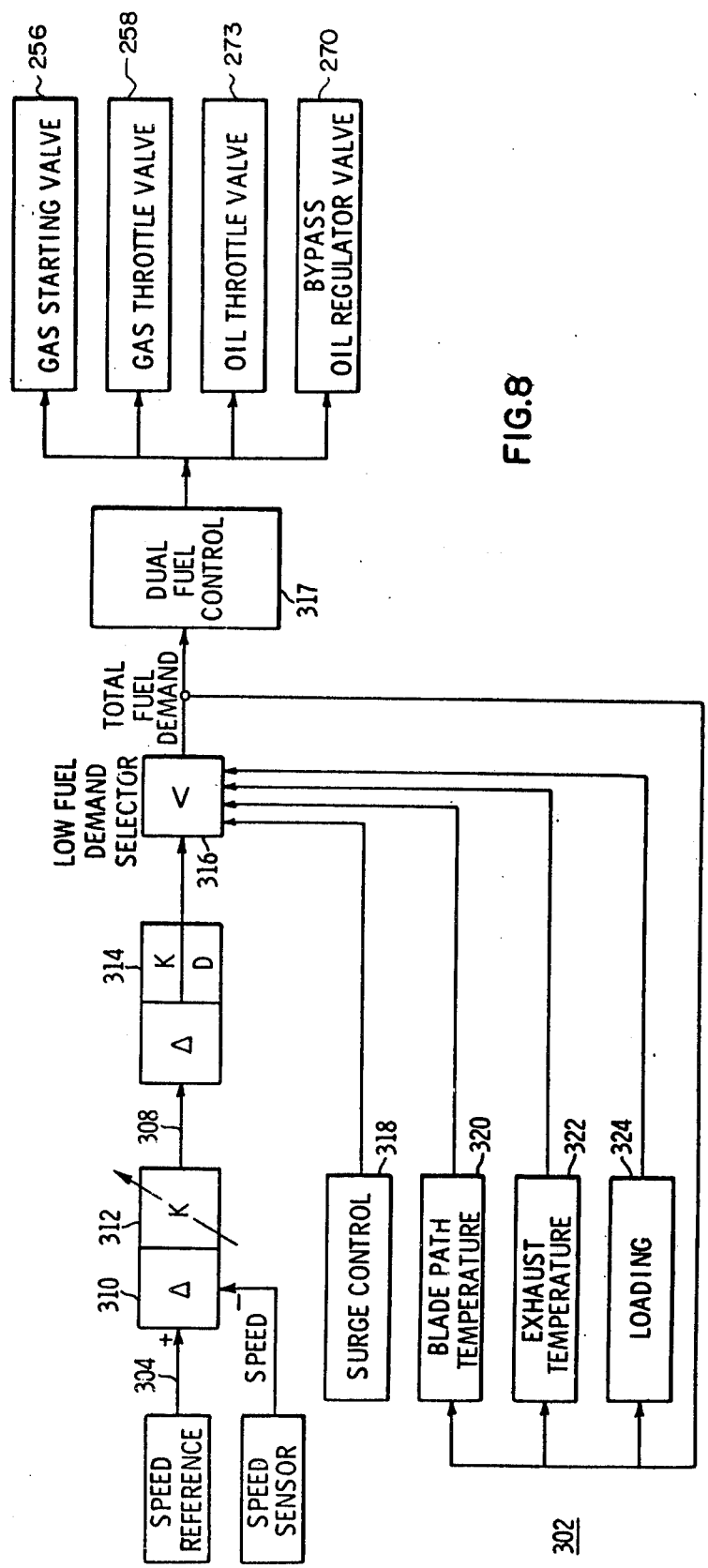
FIG. 8 is a functional block diagram of a portion of the primary control system showing certain control loops therein.

In FIG. 8, a control loop arrangement 302 represented by SAMA standard function symbols characterizes the preferred general control looping embodied in the preferred control system 300 and applicable in a wide variety of other applications of the invention. Reference is made to the aforementioned, copending U.S. patent application No. 82,470, Section B2, pages 39 to 51, wherein there is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made between hardware and software elements since many aspects of the control philosophy can be implemented in hard or soft form. However, it is noteworthy that various advantages are gained by hybrid software-hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade temperature control 320, and an exhaust temperature control 322. In this application, a load control block 324 becomes operative after synchronization with the limit blocks 318, 320 and 322. Thus, the operation of the plural control loop 302 as a function of the various limit representations varies during the various control modes of operation.

At the output of the low fuel demand selector 316, the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

In order to start the plant 100, the control system 300, operating in control Mode 0, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes a feedforward characterization is preferably used to determine representation of fuel demand needed to satisfy speed requirements. Measured process variables including turbine speed, the controlled load variable or the plant megawatts, combustor shell pressure and turbine exhaust temperatures are employed to limit, calibrate or control the fuel demand so that apparatus design limits are not exceeded. The characterization of the feedforward speed fuel demand, a surge limit fuel demand and a temperature limit fuel demand are preferably non-linear in accordance with the nonlinear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

The control arrangement 302 is implemented such that different process variables are given greater weight in determining the control function to be performed as control progresses sequentially through the modes of operation.

Figure 12:
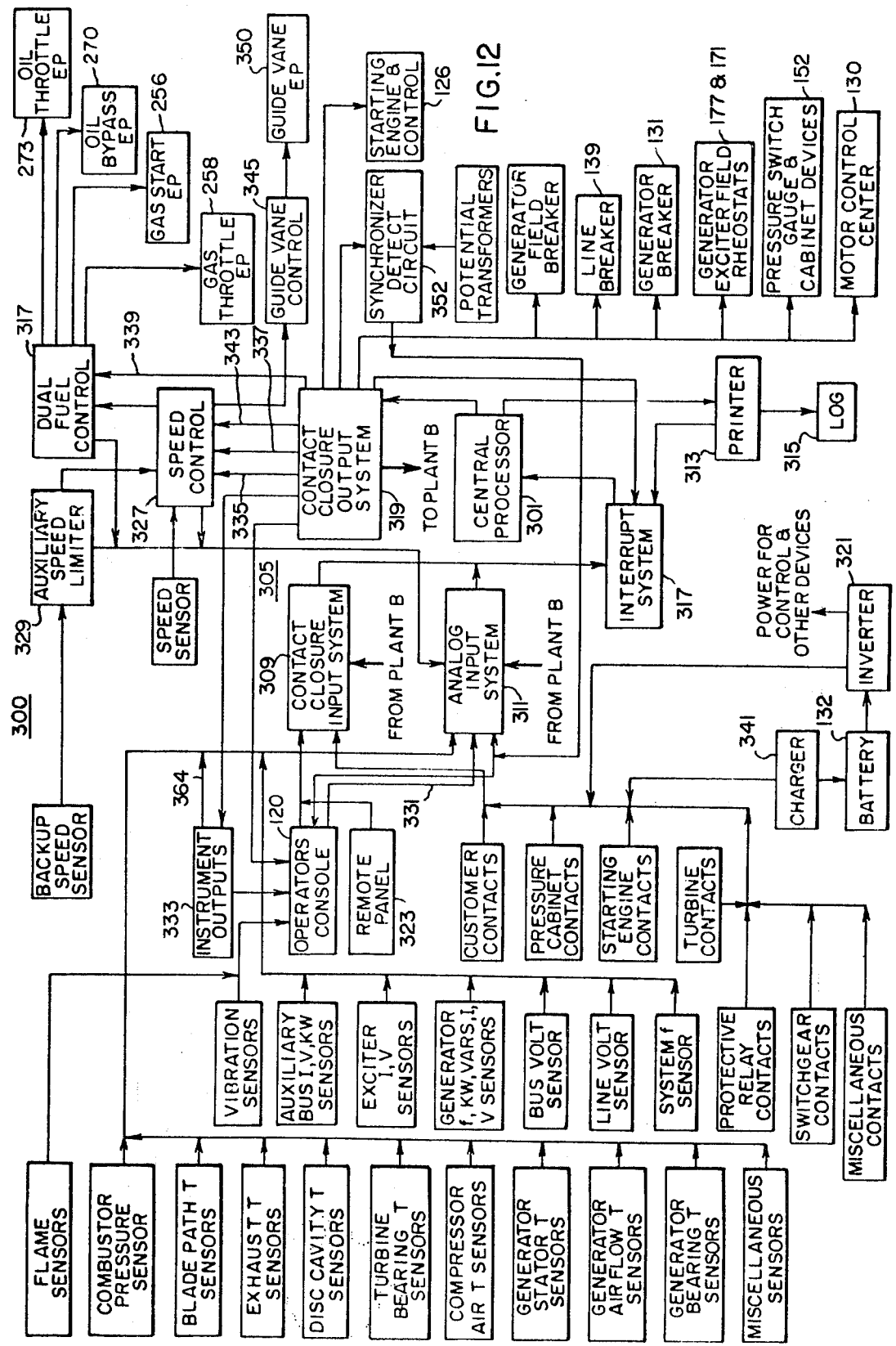
FIG. 12 illustrates a block diagram of the primary digital computer implemented control system used to operate the gas turbine power plant shown in FIG. 9.

The control system 300 is shown in block diagram detail in FIG. 12. It includes a general purpose digital computer system comprising a central processor 304 and associated input/output interfacing equipment such as that sold by Westinghouse Electric Corporation under the trade name Prodac 50 (P50). Generally, the P50 computer system employs a 16,000 word core memory, with a word length of 14 bits and a 4.5 microsecond cycle time.

More specifically, the interfacing equipment for the computer 304 includes a contact closure input system 306 and a conventional analog input system 308. Sixty-four input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 306 and the analog input system 308. The contact closure input (CCI) system is coupled to the operator console panel 120 and remote operator's panel 322. Characteristic CCI's are those related to the starting engine contacts. Also, a facility exists for customer selection of devices to be coupled to the CCI system.

Characteristic inputs to the analog input system 308 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 308 through an analog speed control 324 and an auxiliary speed limiter 326, respectively.

The computer supplies essential outputs of various description for display at the operator's console 120 or the like. They are also applied as analog inputs as indicated by reference character 330. The contact closure output system 316 transfers digital speed reference, speed/load limit and fuel transfer outputs to its external circuitry as indicated respectively by the reference characters 332, 334 and 336.

The coupling of the contact closure output system 316 with the analog speed control 324 is within the framework of the preferred software/hardware hybrid control system. Another contact closure output 338 to the analog speed control 324 provides for a minimum fuel flow into the turbine combustor system in order to prevent flameout after ignition.

Figure 19:
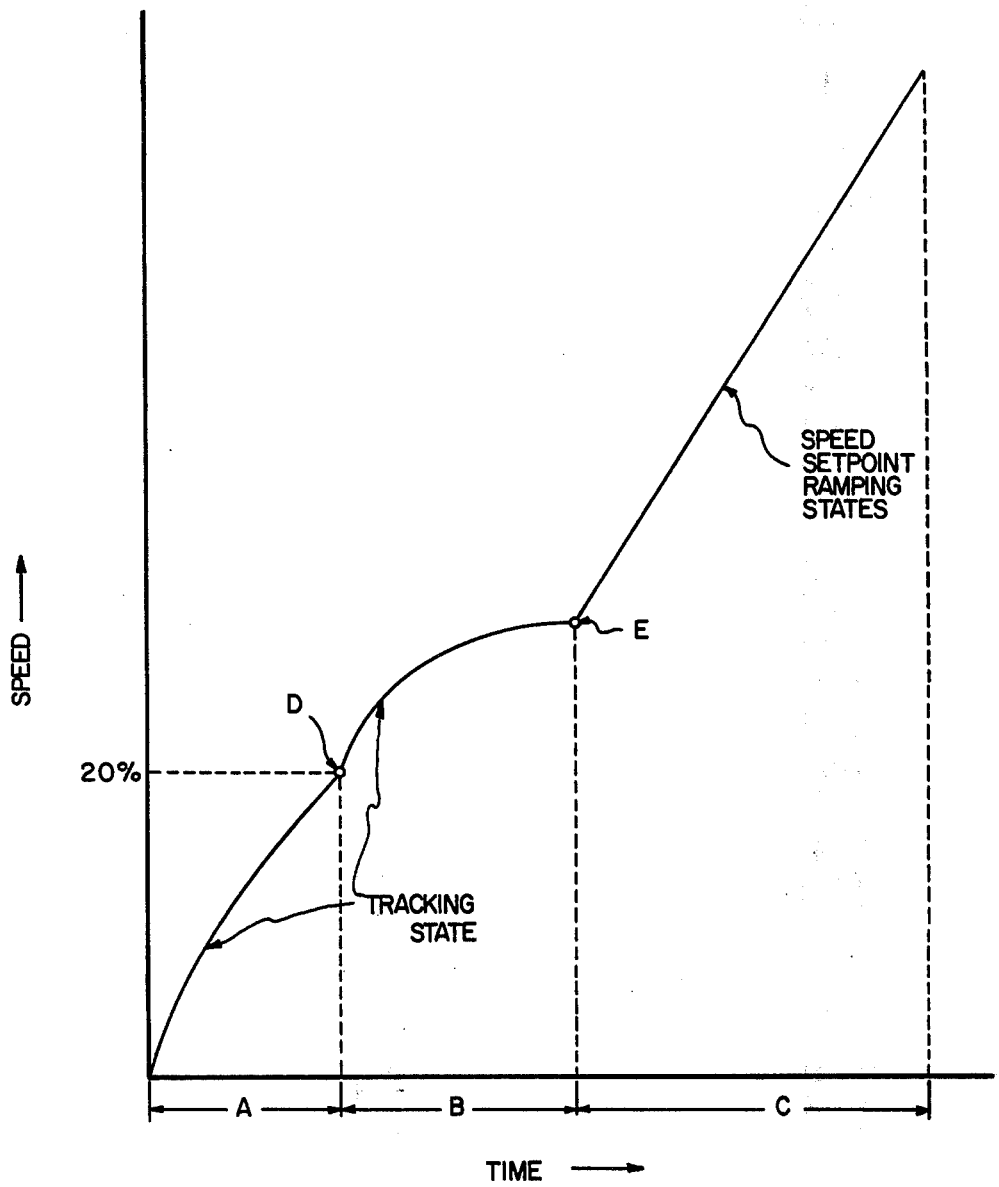
FIG. 19 graphically illustrates the effect on turbine speed of the present invention and non-use thereof.

An analog dual fuel control system 337 is operated by the speed control 324 to determine the position of the liquid and gas fuel valves considered in connection with FIGS. 12 and 19. A contact closure output coupling to the dual fuel control 337 provides for transfer between fuels or relative fuel settings for two fuel or single fuel operation as indicated by the reference character 336.

The contact closure output system 316 is also connected to the operator's panel 120 and to sequence the starting engine 126. A synchronizer detection circuit 342 has bus line and generator potential transformers coupled to its input and the contact closure output system 316 signal provides a visual panel indication for manual synchronization. The detection circuit 342 also supplies signals to the analog input system 308 for automatic synchronization when such synchronization is employed as considered more fully in the aforementioned Reuther and Reed copending patent applications.

Other devices operated by the contact closure outputs include the generator field breaker and the generator line breakers 132 and 137. The motor operator generator exciter field rheostat 171 and 177 and various devices in the motor control center 130 and the pressure switch and gauge cabinet 152 also function in response to contact closure outputs. The printer or teletype 310 is operated directly as a special input/output channel to the main frame 304.

The Local Maintenance Controller - General

Figure 1:
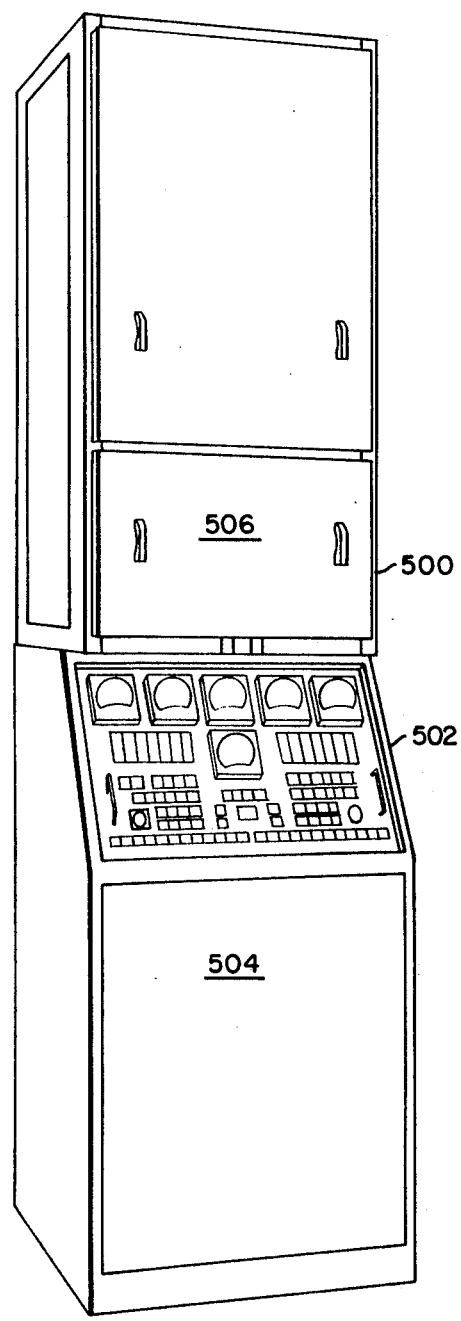
FIG. 1 shows an isometric view of an operator's console incorporating both the primary control and local maintenance controller panels.

The local maintenance controller 501 (hereinafter the LMC), as previously noted, provides a convenient, reliable and efficient means of continuing plant operation during maintenance or failure of the primary control system. As shown in FIG. 1, the LMC operator's panel 500 is conveniently mounted above the primary control operator's panel 502 in a console 504. If the computer goes down or during LMC controlled maintenance periods, the operator only has to remove panel cover 506 to expose the LMC operator's panel 500. The LMC operator's panel is shown in greater detail in FIG. 3. The details of the operator's panel 500 are set forth in the appendix to incorporated U.S. patent application Ser. No. 476,182 and should be referred to for panel item identification and specific information.

Because of the convenient mounting arrangement, all operator controls, meters and indicators are advantageously arrayed within the operator's view and reach. The LMC panel 500 includes separate speed and fuel demand indicators, but meters indicating megawatts, synchronous phase angle and kilovolts are not duplicated on the LMC. These meters, which are on the primary control operator's panel 502, are direct wired to the generator analog transducers and are therefore not affected by the disconnection of the computer from the overall system.

Figure 2:
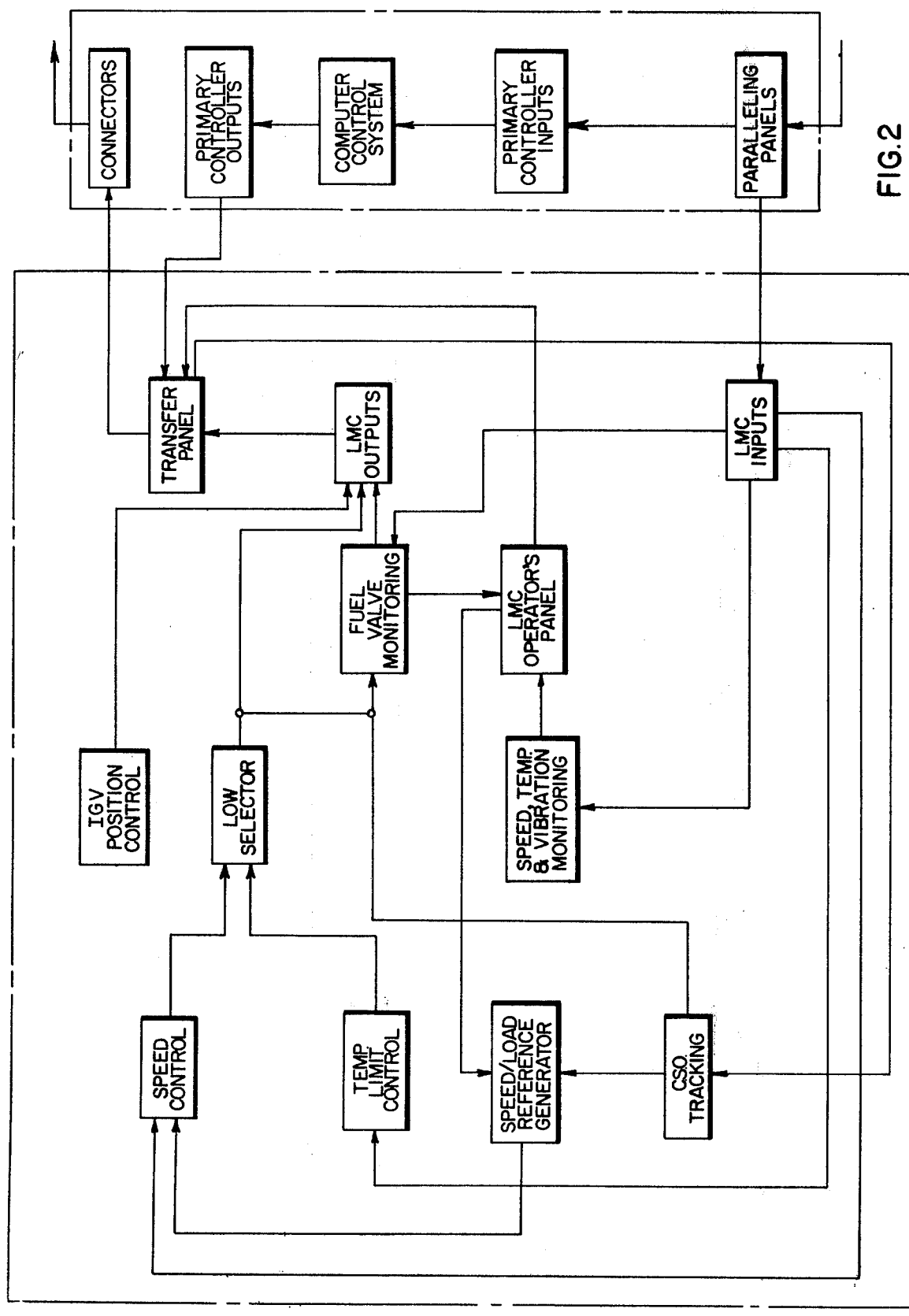
FIG. 2 is a block diagram illustrating the interface and cabling connections between the primary control system and the local maintenance controller, as well as the constituent element of the latter.

FIG. 2 illustrates the cabling interface between the primary control system and the LMC. As shown therein, all analog and contact outputs that are switched between the LMC 501 and the computer are transferred in the LMC 501 through transfer relays (not shown) mounted in transfer panel 508. All inputs to the overall control system from the plant are paralleled at the paralleling panels 510 at the point where they enter from the field. This reduces the amount of cabling required, as well as the transfer hardware, and keeps the computer cables within the computer cabinet. In addition, this procedure provides for continuous computer monitoring of all variables prior to a required transfer to LMC operation. The signals used by the LMC are shown in Table I of the referenced appendix. These consist of CCO's, CCI's and analog signals. Using the cabling scheme illustrated in FIG. 2, signals from the plant are switched between the LMC and the primary control system by means of the transfer relays. The paralleled inputs to each control system are isolated from each other by diodes.

Turbine exhaust blade thermocouple inputs to the LMC 501 are connected in parallel with those inputs to the computer. A transfer switch provides for receipt of the temperature signal, developed by these thermocouples, by the operative control system. When the plant is being operated by the LMC, the computer merely follows the thermocouple readings. When the plant is under primary control, the transfer switch action disconnects the inputs to the LMC.

Before a transfer of control to the LMC can be initiated, the "Transfer Enable" pushbutton on LMC panel 500 must be depressed. If both the "Lube Oil" and "Turning Gear" toggle switches are on and the LMC system is properly tracking, the "Transfer Enable" pushbutton lights to indicate that the LMC is ready to accept either automatic or manual transfer. The turbine must be operating on a single fuel, either oil or gas, with the generator breaker closed for successful on-line transfer to occur. There are systems where a remote primary control panel is utilized. On such systems, an indicator light is added to the panel to show that transfer to the LMC has been made. Another light added to the remote panel provides information concerning the LMC to the operator and confirms that the LMC is tracking and enabled.

The logic required for automatic transfer of control to the LMC in the event of computer failure is contained in the relay sequencer, see FIGS. 6A-P and 7A-B. This unit comprises 43 relays and associated circuitry and is mounted on two printed circuit boards within the LMC console. The relay sequencer also embodies all of the logic required to accomplish a startup with the LMC as well as alarm and trip circuits for turbine protection. When the computer fails, assuming the LMC has been enabled as described above, a relay in the primary control system indicates to the LMC that transfer of control is necessary. During the following 1 to 2 seconds, control signals to all valves are held constant while the sequence and alarm logic is reset. The LMC then automatically takes over turbine control. Manual transfer from the primary control system, with the computer continuing to operate or disabled for maintenance purposes, is accomplished in a similar manner, starting from the "Transfer Enable" pushbutton actuation. In this latter case, however, the transfer is initiated by depressing the "LMC On" pushbutton, rather than by computer failure.

Transfer from primary to LMC control is initiated in the LMC sequencer from either detection of primary control system failure or manual selection from the operator's panel. While the primary control system is functioning, the LMC acts as a tracking system to insure minimum fuel valve position change when a transfer occurs. The LMC also continuously monitors and compares the fuel demand signal it develops and the fuel demand signal developed by the primary control system. Should a signal disparity exceed prescribed limits, the LMC will initiate a transfer prevent signal. The LMC also monitors and compares against maximum limits the blade path temperature, compressor vibration and turbine exhaust end vibration and will initiate turbine trip and shutdown from these sources.

If all permissives are satisfactory, the LMC will assume turbine speed/load control upon primary control system to LMC transfer. The transfer will be accomplished at identical fuel valve position values existing under primary control immediately prior to transfer. Hence, transfer is accomplished at existing megawatt output, blade path temperature and fuel oil pump discharge pressure.

Following transfer to the LMC, blade path temperature is limited to a peak load reference curve developed within the speed/load reference generator 512 (see FIGS. 2 and 4A-B) and oil pump discharge pressure is controlled to its setpoint as developed within the LMC. Thus, should the transfer occur above peak load, i.e., when the primary control has been operating the plant on system reserve, a load reduction to peak load limit will follow the transfer. Also, any disparity between primary control and LMC pressure setpoints will produce a slight change in firing rate, and consequently megawatt output, following a transfer. Thereafter, the LMC will maintain a constant, fixed megawatt output which can only be varied by the panel mounted, manually actuated, increase/decrease load pushbuttons.

Should the primary control system be taken offline during startup, before the breaker is closed, or while the turbine is operating on a mixture of fuels, an attempt to transfer control will cause the turbine to shut down. Any attempt to change fuels during startup with the LMC will also cause shutdown, while such an attempt during LMC operation will be ignored.

In any event, the LMC is capable of automatically controlling a turbine start from ignition to synchronous speed (95%). The LMC start must be attended and manually initiated from the LMC operator's panel. However, the LMC will prevent a start if the fuel demand signal exceeds a minimum value near zero. Following ignition, the LMC automatically ramps fuel demand signal per a prescribed fuel rate timing program, subject to blade path temperature limit, terminating at approximately 95% turbine speed. Thereafter, synchronization and megawatt loading is accomplished by remote manual pushbutton operation from the LMC operator's panel.

The status input information required by the LMC analog system from the sequencer and panel contact closures are set forth in the referenced appendix as are the required analog input signals. Reference should also be had to FIGS. 2, 4A-B and 5A-L. Also set forth in the referenced appendix is a listing of the logic contact closure outputs and the analog output signals developed by the LMC analog system illustrated in FIGS. 2 and 4A-B.

Figure 4A:
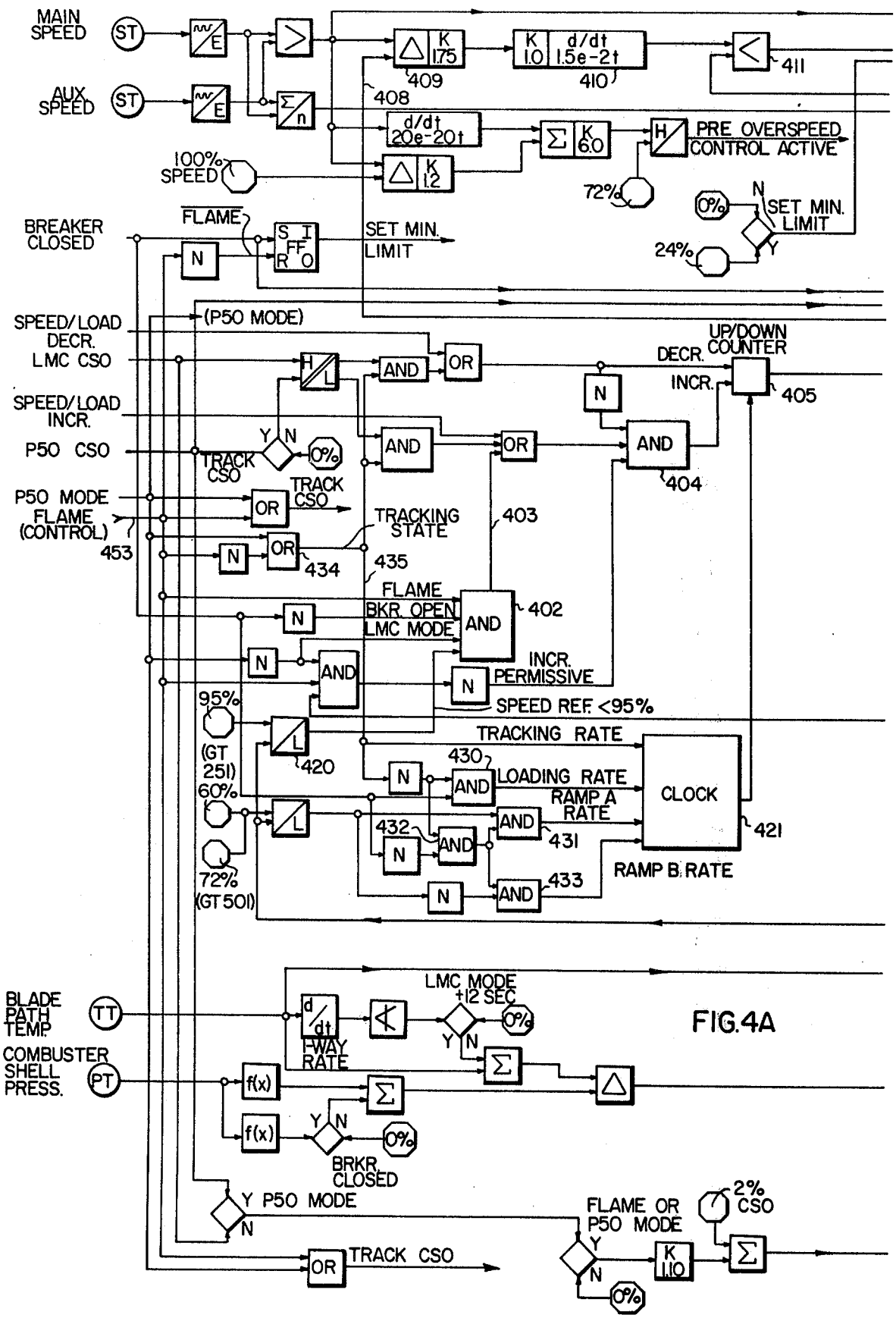
FIGS. 4A–C illustrate a functional diagram of the elements of the local maintenance controller shown in FIG. 2, showing the analog control portion thereof in greater detail.
Figure 4B:
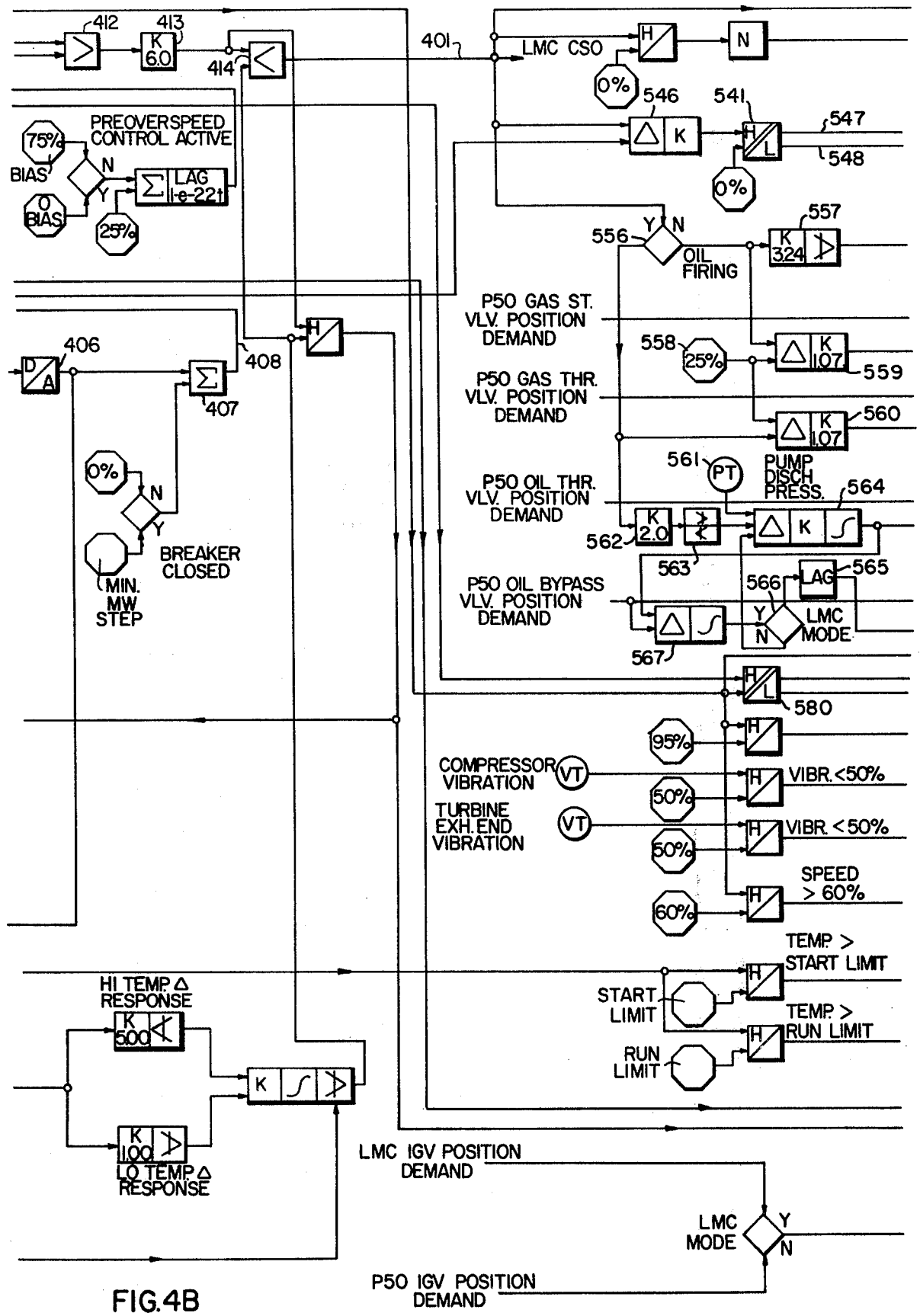

The LMC analog control is shown in block diagram form in FIG. 2 and in functional form in FIGS. 4A-B. It operates in the following manner. The speed control 516, in conjunction with the speed/load reference generator 512, will compare measured speed with speed setpoints and produce a control signal proportional to the error between the compared signals. As in the primary control system, the LMC is subject to minimum and maximum limits. The minimum limit is 25% fuel flow and is set by presence of flame and breaker closure and reset to 0% upon loss of flame by means of flip-flow control logic. The maximum limit varies from 25 to 100% fuel flow, dependent on control action of a preoverspeed cutback control loop. Under normal operating conditions, this loop provides a 100% limit. Should the turbine overspeed and approach the 110% mechanical overspeed trip limit, the maximum fuel limit decays from 100 to 25%. The purpose of this is to avoid a total turbine shutdown and to restore stable speed conditions near synchronous speed. The limit is reduced by a proportional plus derivative control action, which thusly combines both anticipatory and direct control action features.

The analog speed signal will be developed by using two sets of A and B speed cars to convert the pulses developed by the speed pick ups to linear analog speed signals. The higher of these two signals will be selected and used by the speed controller. This system will utilize the same pulse signals used by the primary control system. The systems will be parallel and both operative at the same time. The speed pulse signals will not be transferred.

A stable speed setpoint will be developed by use of an up/down counter and D to A converter, see FIGS. 4A-B. Increase or decrease commands will be developed in analog logic. The up/down counter will operate at one of four rates. Two will be used for startup, that is, to accelerate the turbine from ignition to 95% speed, one for load control and one for tracking. The two startup rates will be selected as follows:

Rate A — Selected when the speed reference is less than 60% for GT Model 251 (72% for GT Model 501), the breaker is open, the primary control is not in service, and the system not tracking.

Rate B — Selected when the speed reference is greater than 60%, the breaker is open, the primary control is not in service and the system not tracking. The loading rate will be selected when the breaker is closed and the primary control system not in service. The tracking rate will be selected when the primary control system is in service or flame is not present.

When the gas turbine is operating on the LMC system, the speed/load setpoint will increase at the selected rate when the increase pushbutton is depressed and a decrease request and temperature limit art not present, or when flame is on and the speed is less than 95% and the breaker is open and a decrease request and temperature limit are not present, or when flame is not present and the LMC control signal output is less than zero.

When on primary control, the speed/load setpoint will increase at the tracking rate when the LMC control signal output is less than the primary control signal output by an amount equal to the deadband of the comparator.

The speed/load setpoint will decrease at the selected rate when operating on the LMC system, if the decrease pushbutton is depressed or when flame is not present and the LMC control signal output is greater than zero. When on primary control, the speed/load setpoint will decrease at the tracking rate if the LMC control signal output is greater than the control signal output of the primary control system. When operating on the LMC system, the speed/load setpoint cannot be increased if LMC control signal output exceeds the blade path temperature limit.

The LMC analog blade path temperature control will function similarly to the primary temperature control in that a function of combustor shell pressure, P2C, will be the reference or maximum temperature setpoint for average blade path temperature. Only two curves will be used, start and peak. When operating on the LMC system, the temperature control will operate as a maximum temperature limit. If, after breaker closure, the speed reference is increased to 104%, the blade path temperature will control the gas turbine at peak load. During startup, or when the breaker is open, the temperature control will stop the speed setpoint ramp and decrease control signal output if the average blade path temperature equals or is greater than the reference.

The temperature reference will be developed by means of two function generators, each developing a curve as a function of combustor shell pressure. One curve will become the maximum temperature setpoint with the breaker open. The other value will be added to the first when the breaker is closed and the sum of the two will equal the running maximum temperature limit setpoint. This system will use the pressure signal from the existing primary control combustion shell pressure transmitter. It will be paralleled and not switched.

The average blade path temperature will be determined by swamping eight thermocouples and amplifying the average. Derivative action will be applied to this signal when the system is in operation, but will be disconnected when the primary control is in service and for a short time delay after control has been transferred to the LMC. This prevents an upset to the system at the time of transfer. This system will use the same thermocouples as the primary control, but they will be disconnected when the primary control is in service, as previously noted.

The temperature reference will be compared with the measured average temperature and an error signal generated. This error signal will have two different gains applied. One for increasing and one for decreasing temperature. The resultant signals will be limited so a narrow deadband can be incorporated in the error signal. The error signals are then applied to a proportional plus integral controller. The output of this controller will be high limited to a value corresponding to approximately 110% of the LMC control signal output. Thus, maximum full load bias will be approximately 0.5 volts, but will decrease as the control signal output decreases. Using the two separately adjustable gains in the temperature controller will permit the fuel to be decreased much faster than it will be increased and will provide increased protection and greater stability to this portion of the system.

The LMC control signal output is derived from the low selection of speed controller and temperature controller outputs. This signal is applied to the LMC fuel valve controls in the identical manner as the primary control signal output is applied to the primary control valve position analog controls. The valve controls are duplicated in both control systems, thus valve position output signals are continuously available from either.

Transfer from the primary control system to the LMC will be accomplished by energizing relays containing four contacts, one for each fuel valve demand signal. The transfer command signal will be developed in the sequencer portion of the LMC system and will not be described here. These four signals, the eight thermocouple signals and other signals as required by the sequencer will be transferred at the same time.

The LMC control signal output and the four LMC valve position demand signals are monitored and compared individually with the corresponding signals from the primary control system. Any disparity in these signal comparisons exceeding preset value will result in a transfer prevent, locking turbine control to the existing mode, either primary for LMC, until the disparity is cleared.

The referenced appendix also contains, in addition to previously noted references, the following: (a) Descriptive Bulletin 23-833; (b) transfer subsystems; (c) LMC Analog Control System — Maintenance and Calibration Instruction; and (d) Instruction Book — Local Maintenance Controller for Gas Turbine Systems.

The Local Maintenance Controller — Ramping Delay

For purposes of describing the present invention and its intereaction with and effect upon the local maintenance controller generally described herein, it will be assumed that the primary control system is "down" and that the turbine 100 is to be started and brought up to operating speed (95%) by the LMC 501. It will be appreciated by those having skill in this art that the advantages realized in the LMC 501 as a result of employment therein of the present invention are also realizable in a primary control system which operates, at least through the ignition stage, in a manner identical or similar thereto.

Figure 4C:
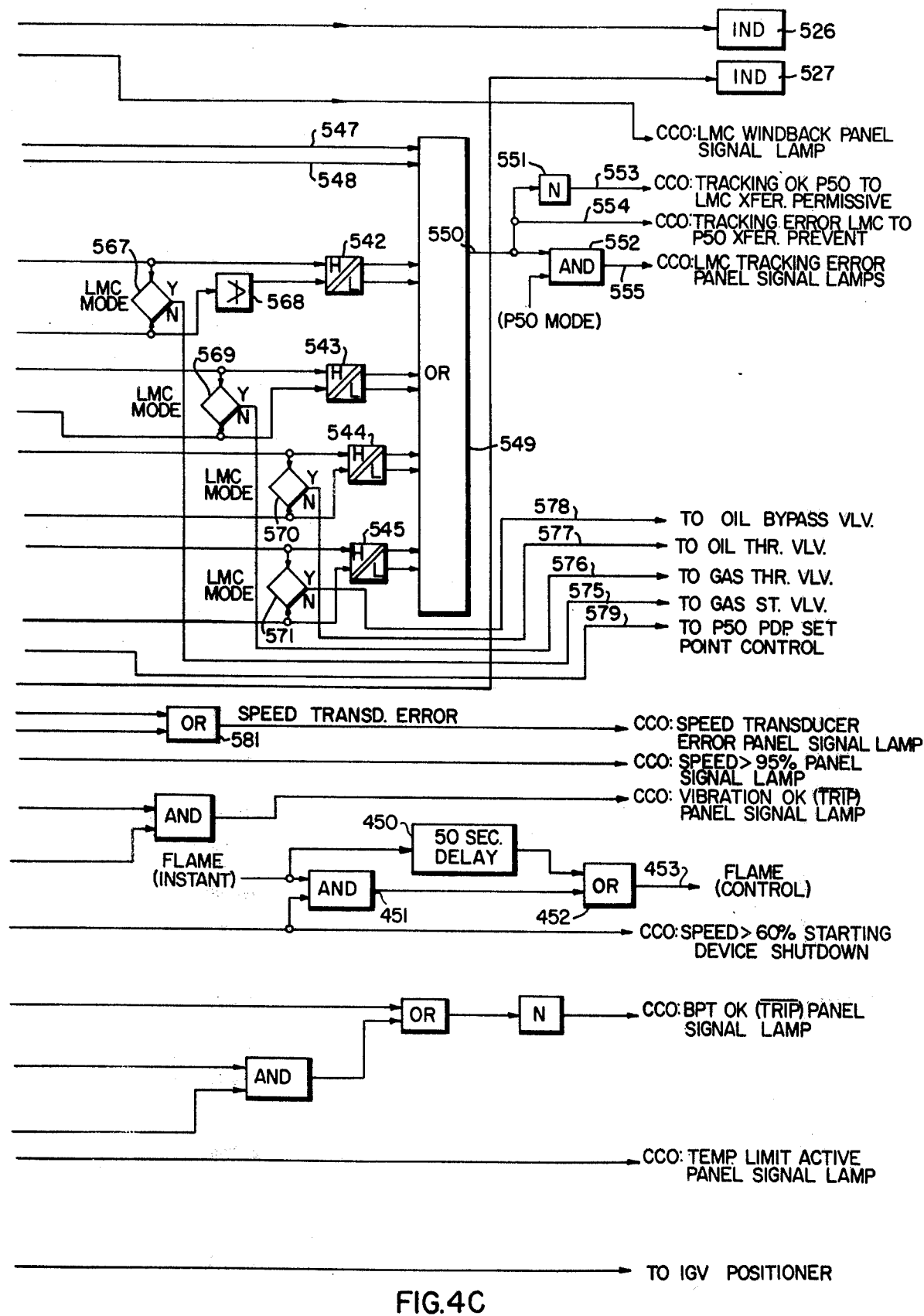
Figure 5A:
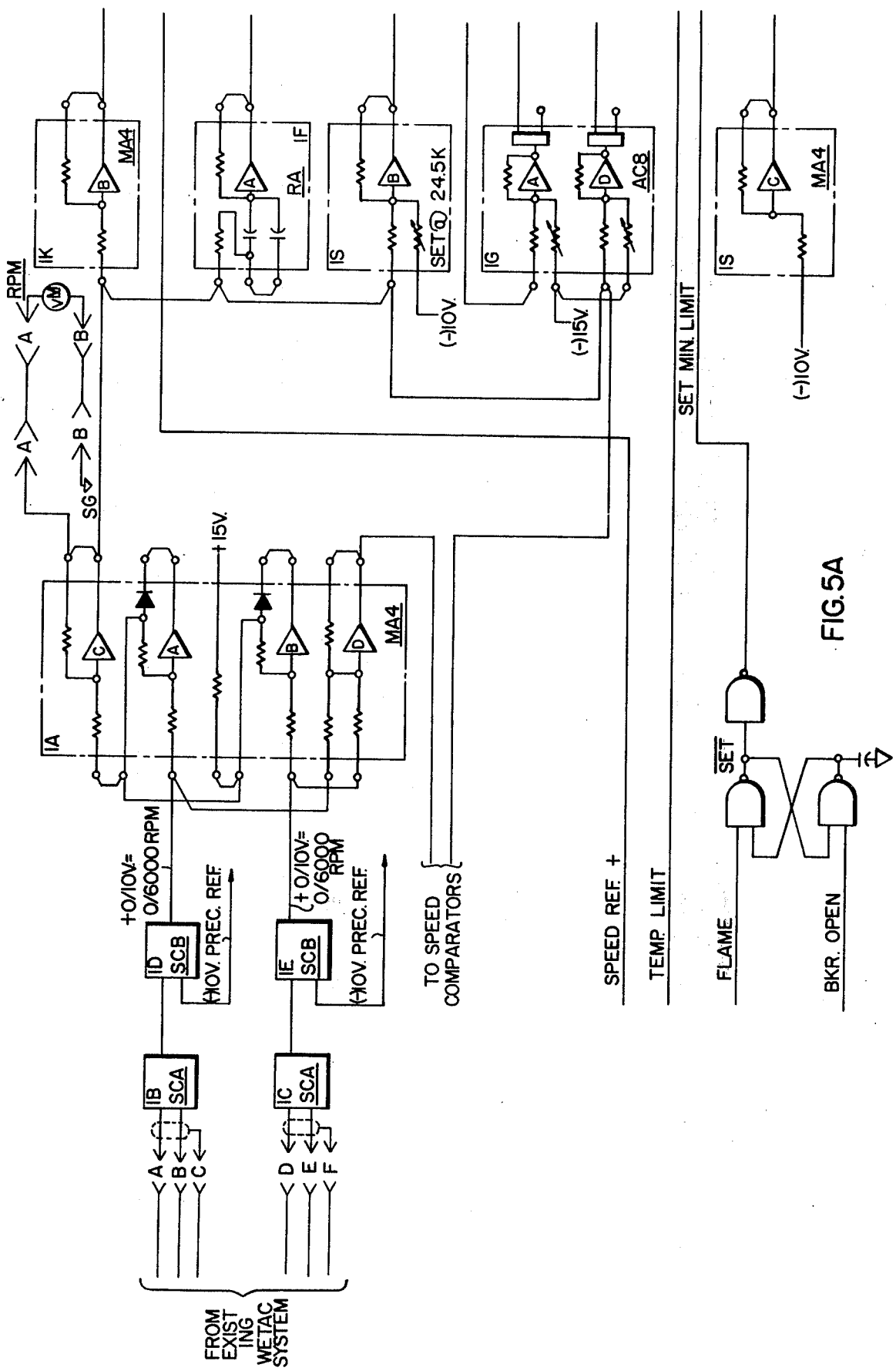
Figure 5B:
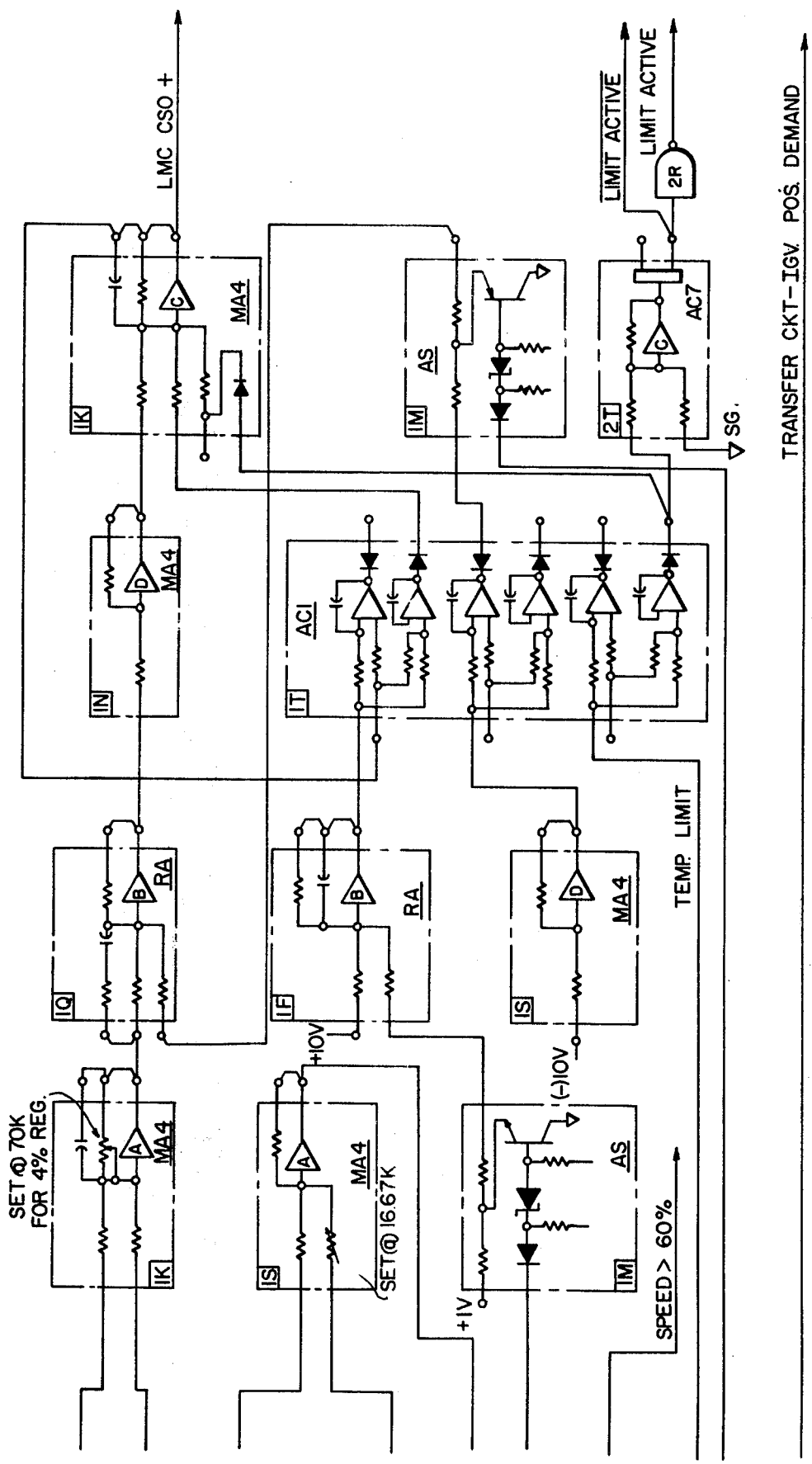
Figure 5C:
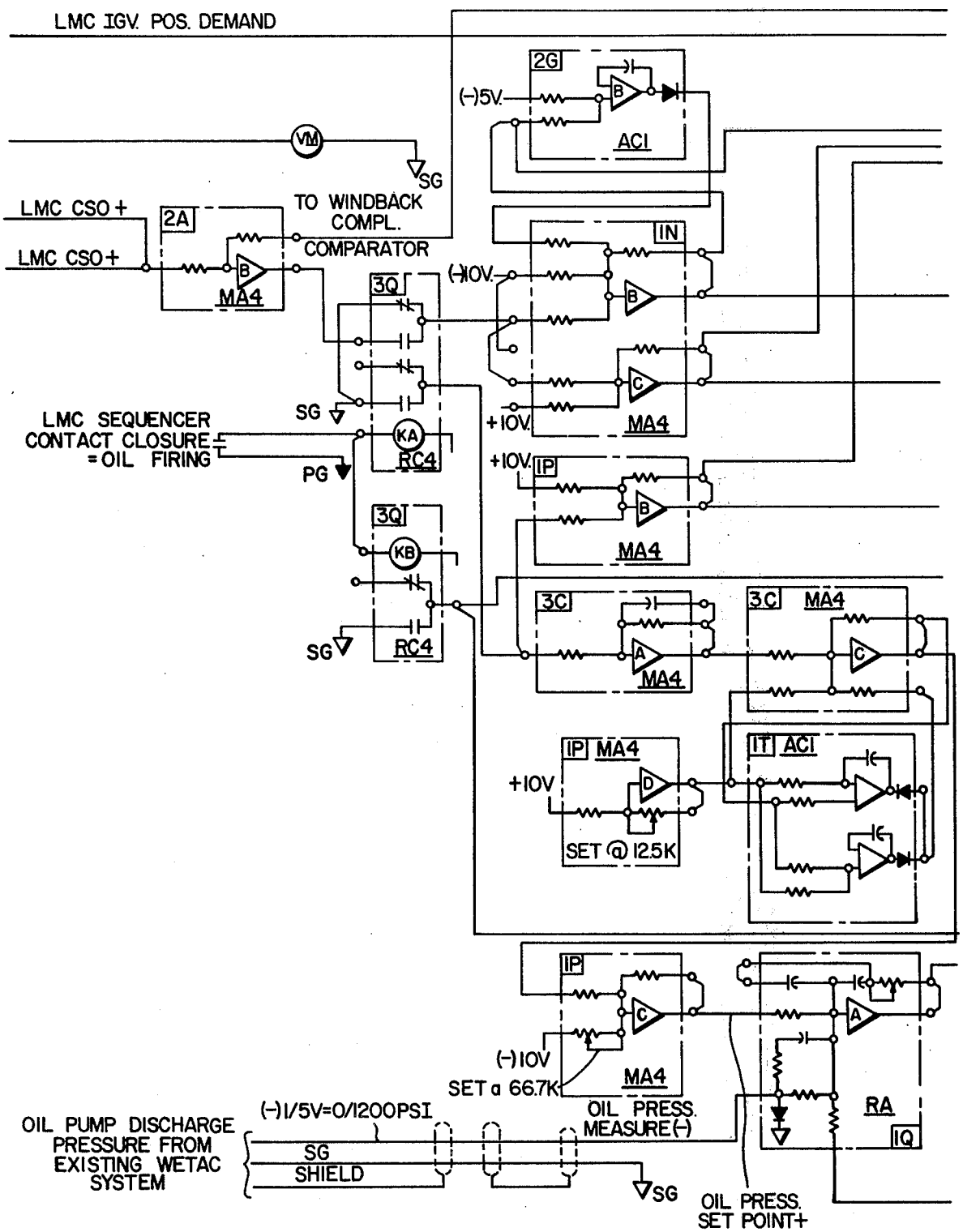
Figure 5D:
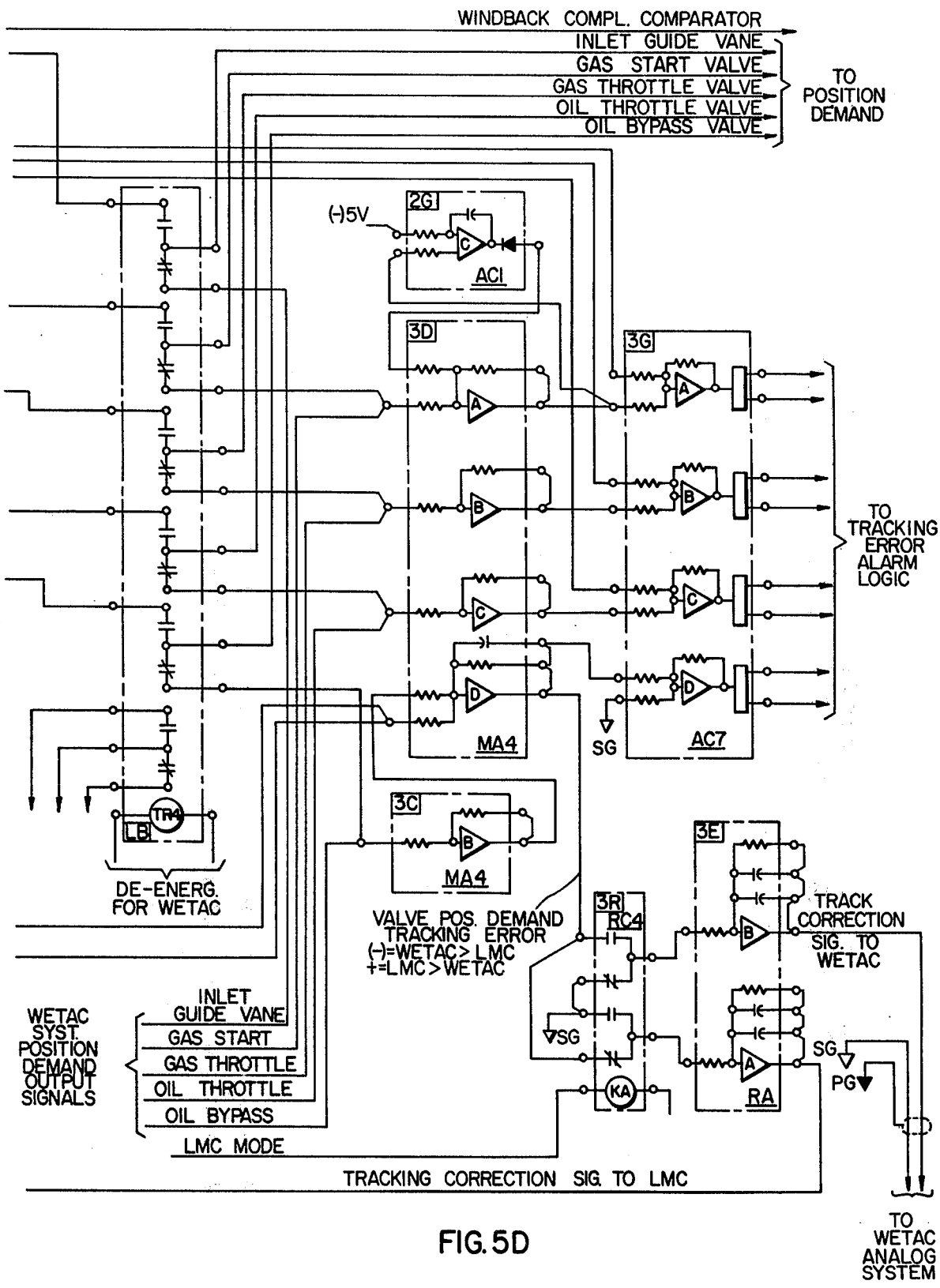
Figure 5E:
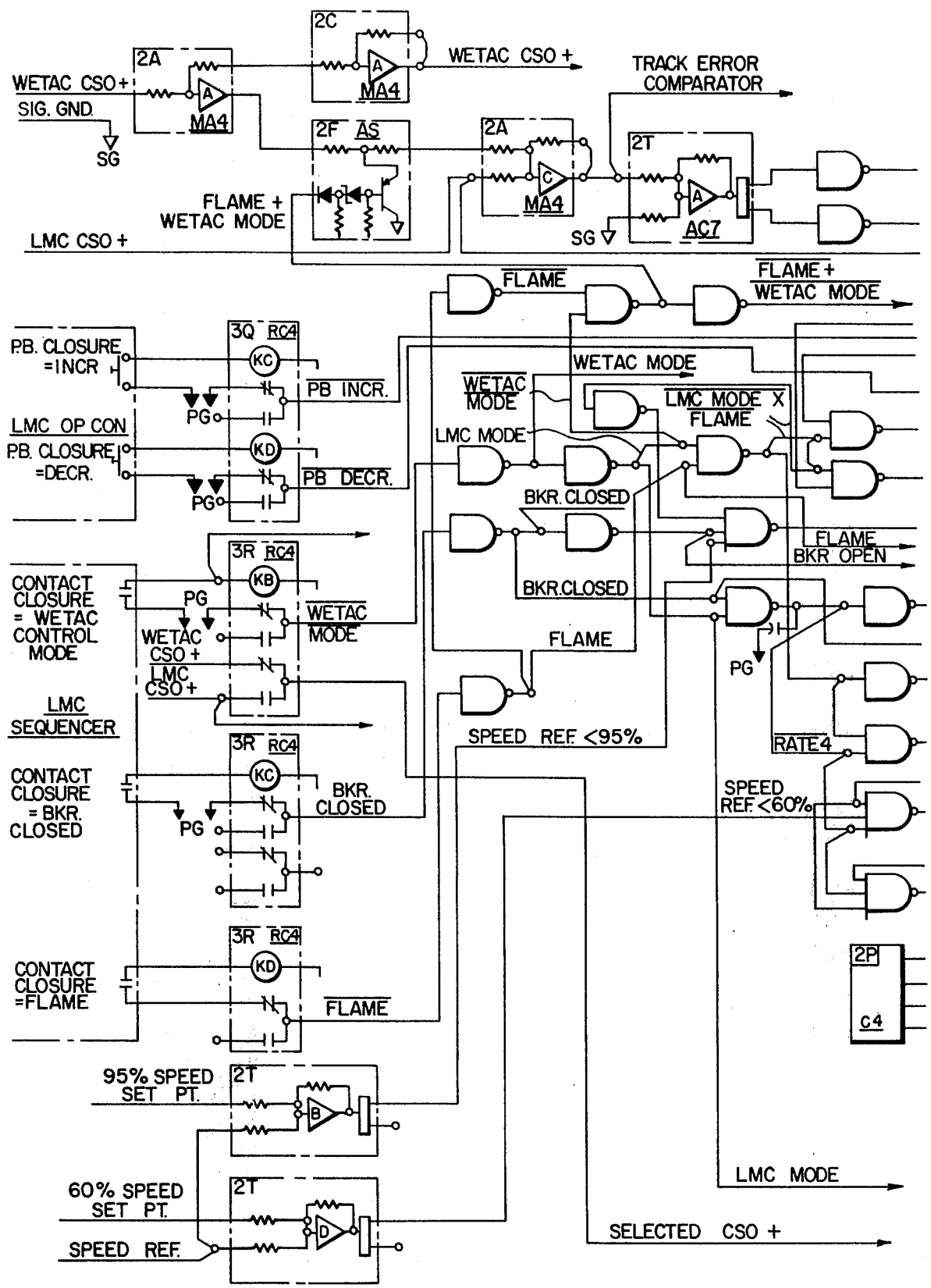
Figure 5F:
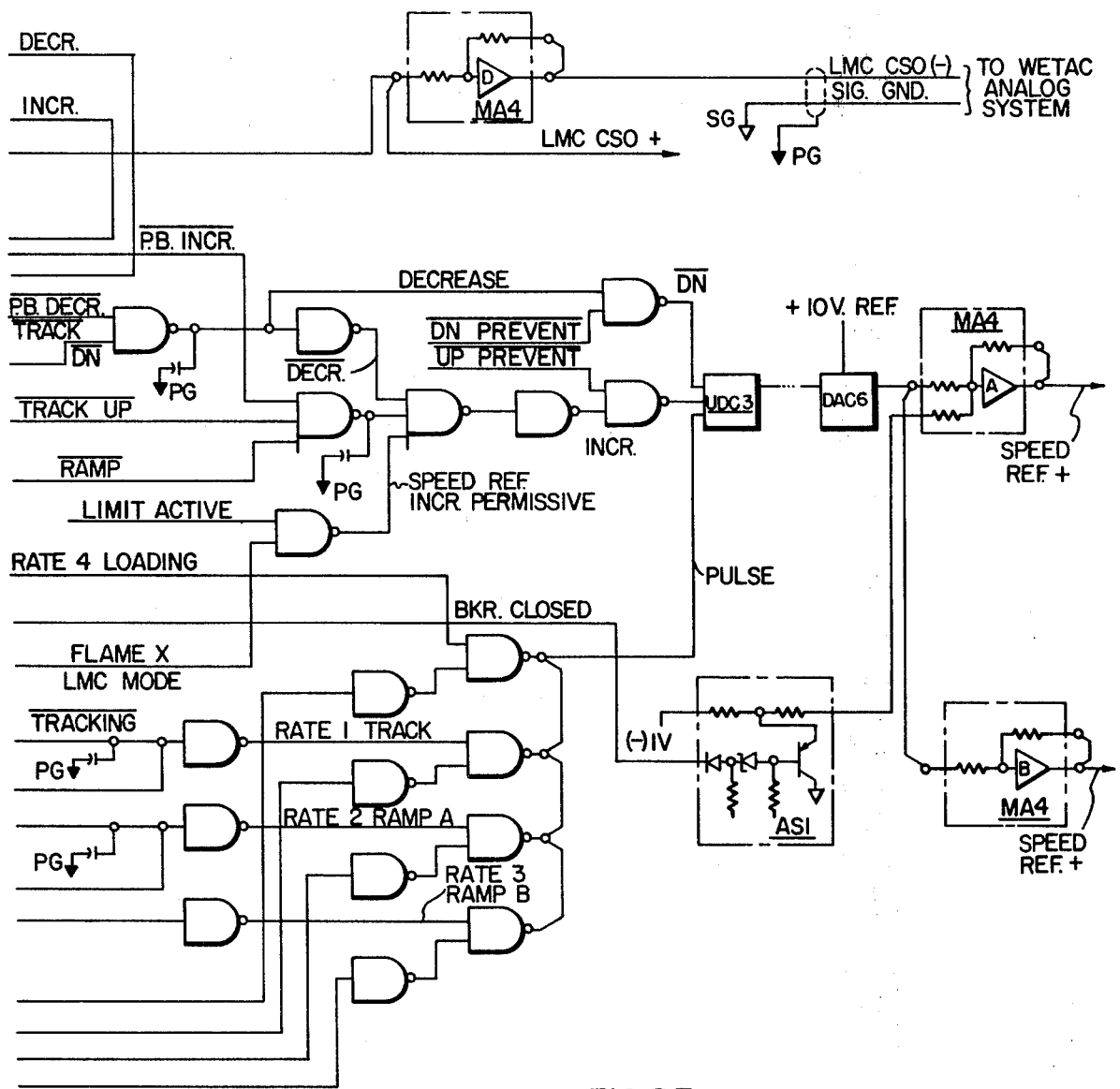
Figure 5H:
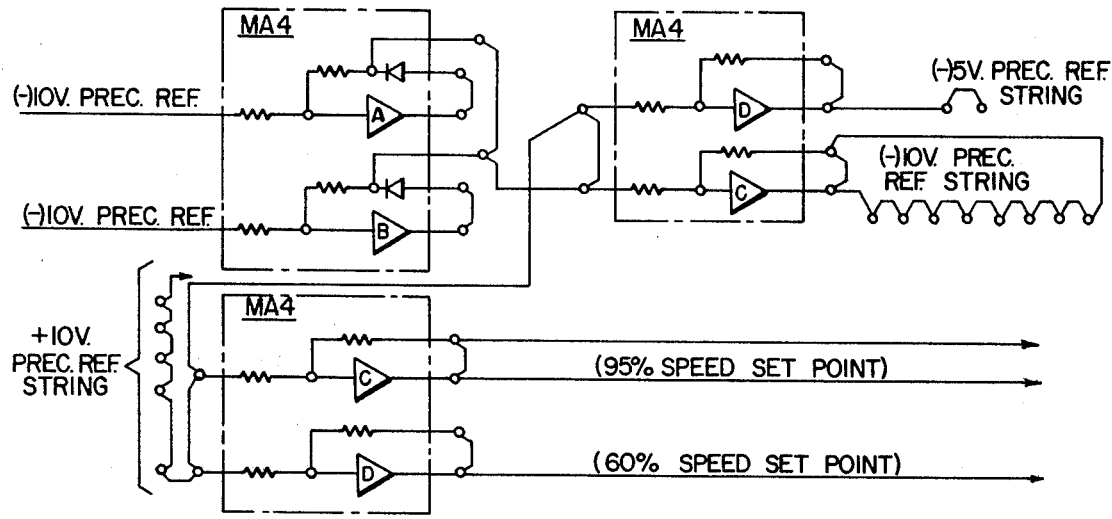
Figure 5I:
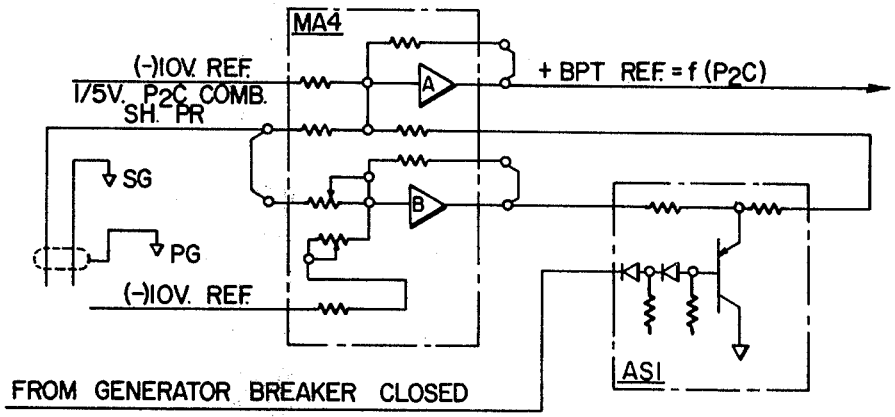
Figure 5I:
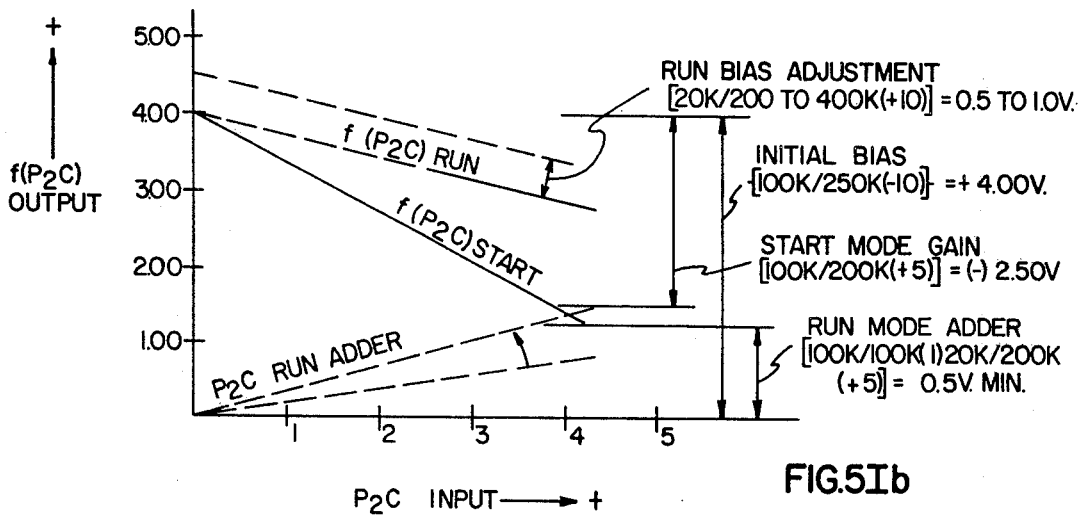
Figure 5J:
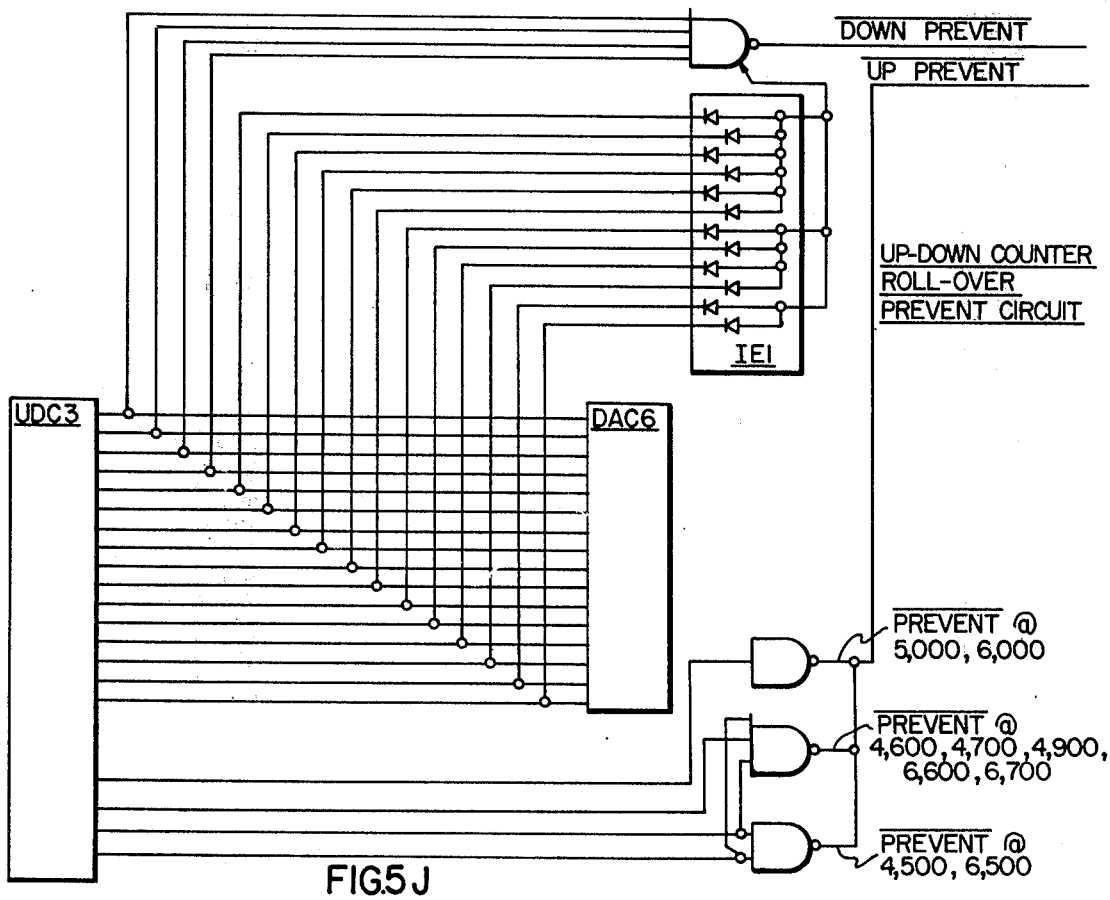
Figure 5K:
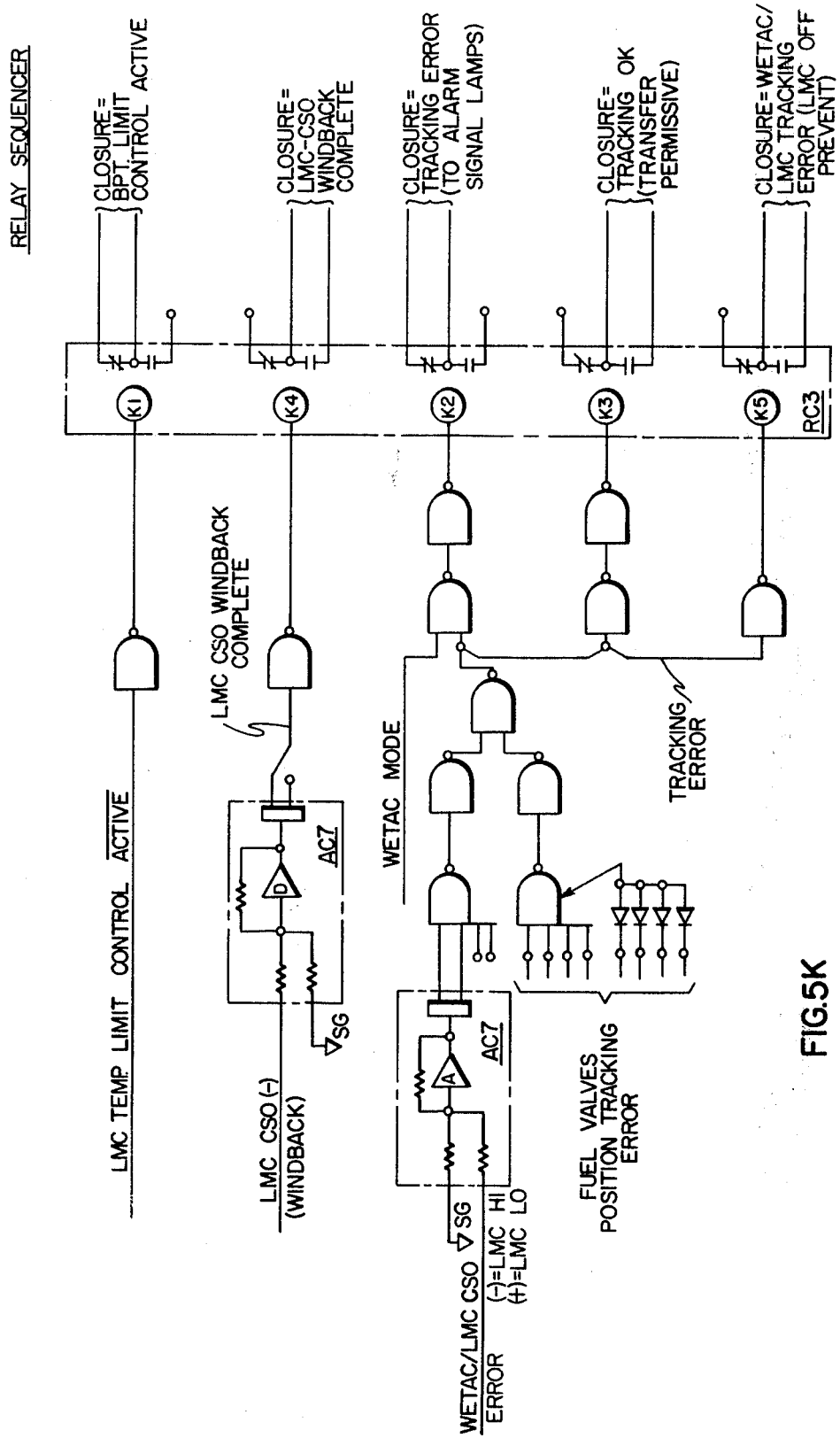
Figure 5L:
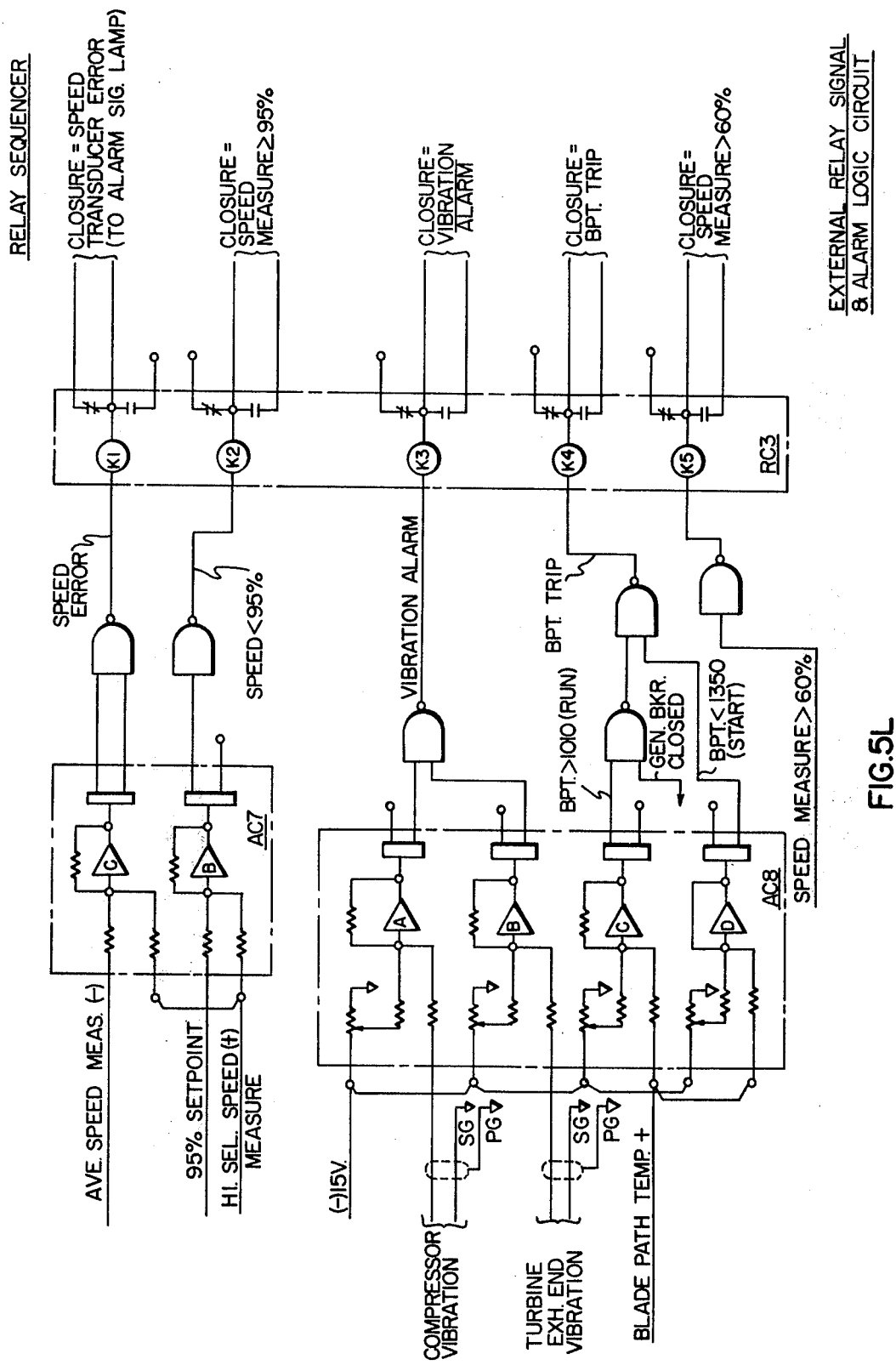
Figure 6A:
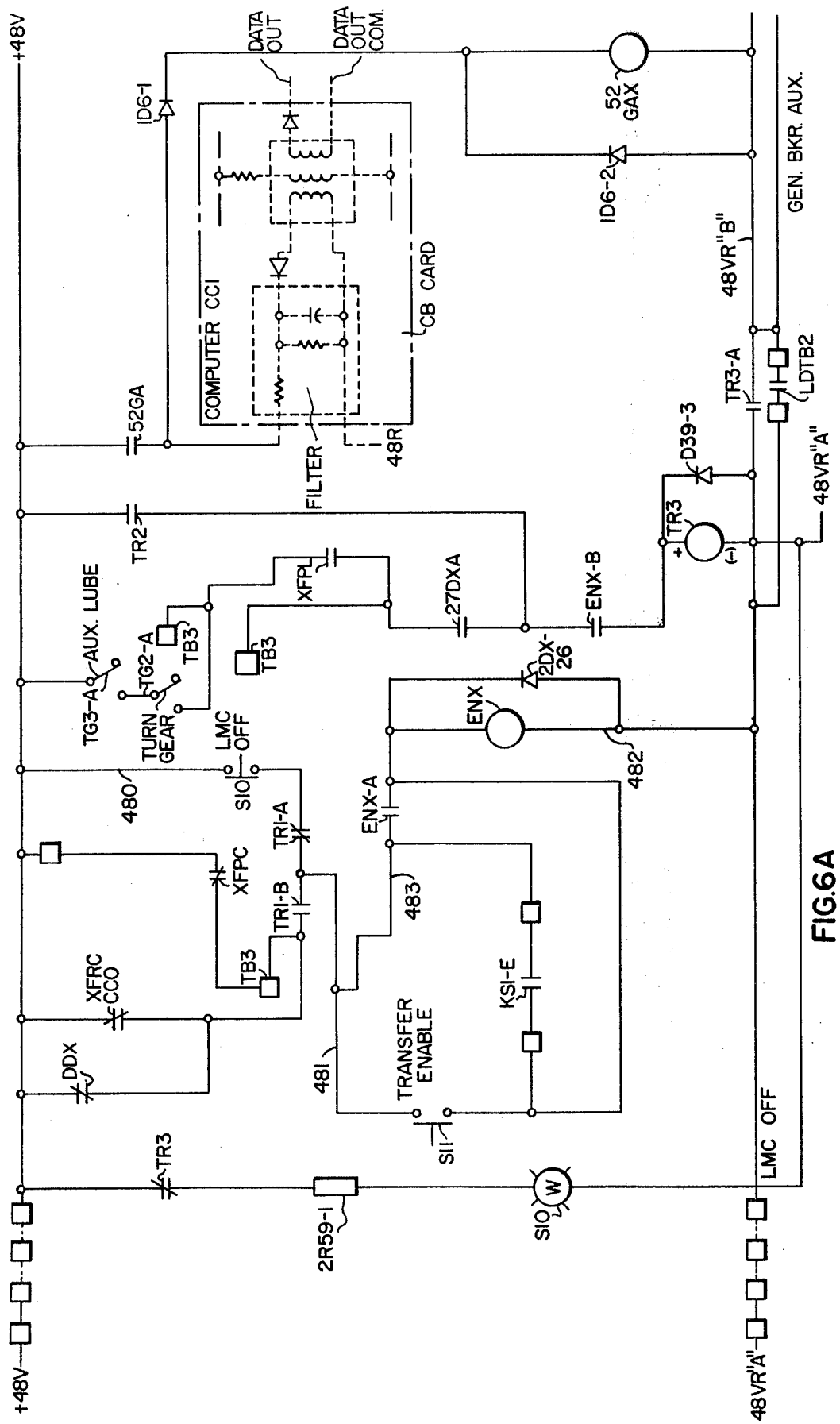
FIGS. 6A–P depict the sequencing arrangement employed in the local maintenance controller.
Figure 6B:
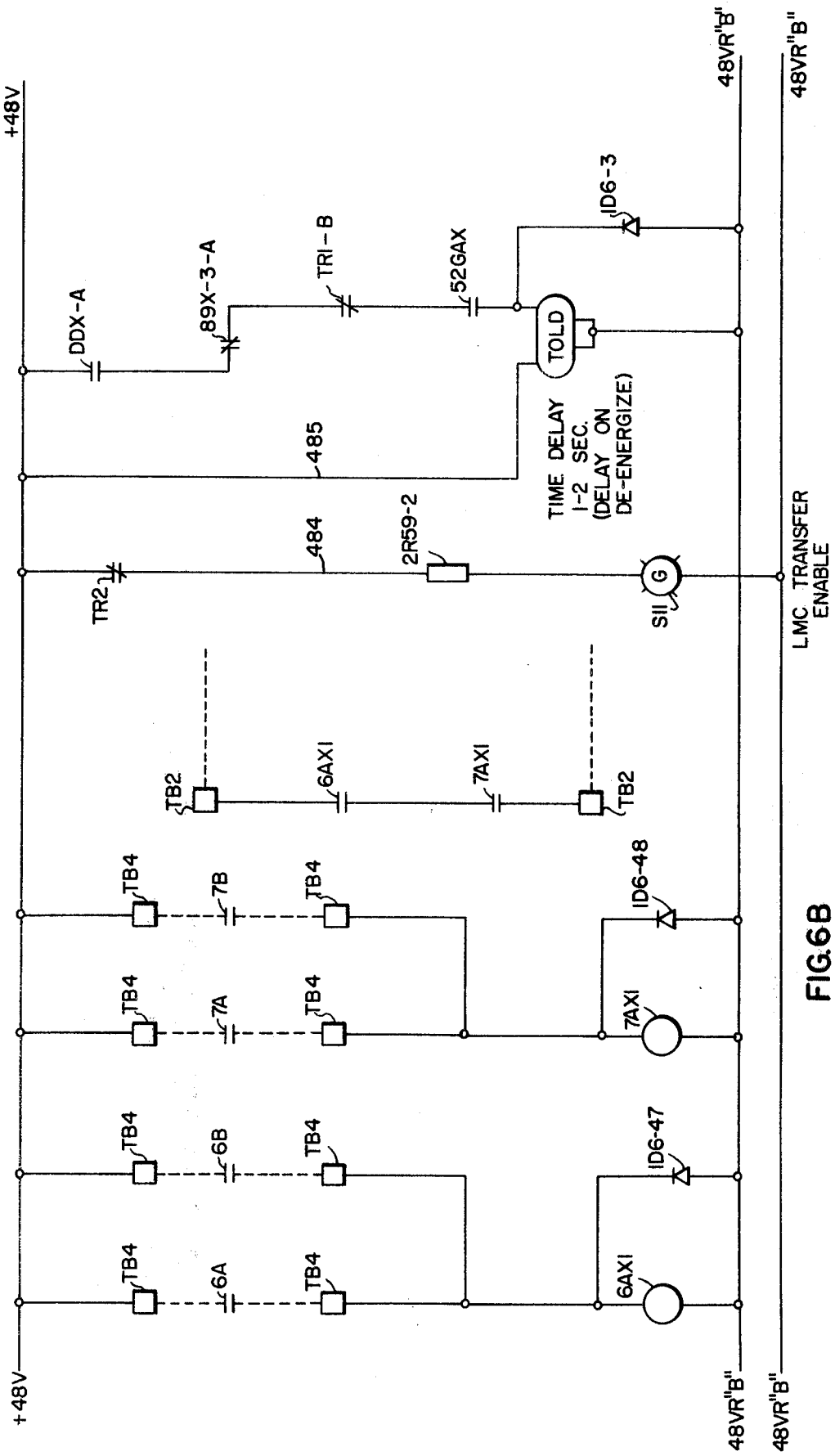
Figure 6C:
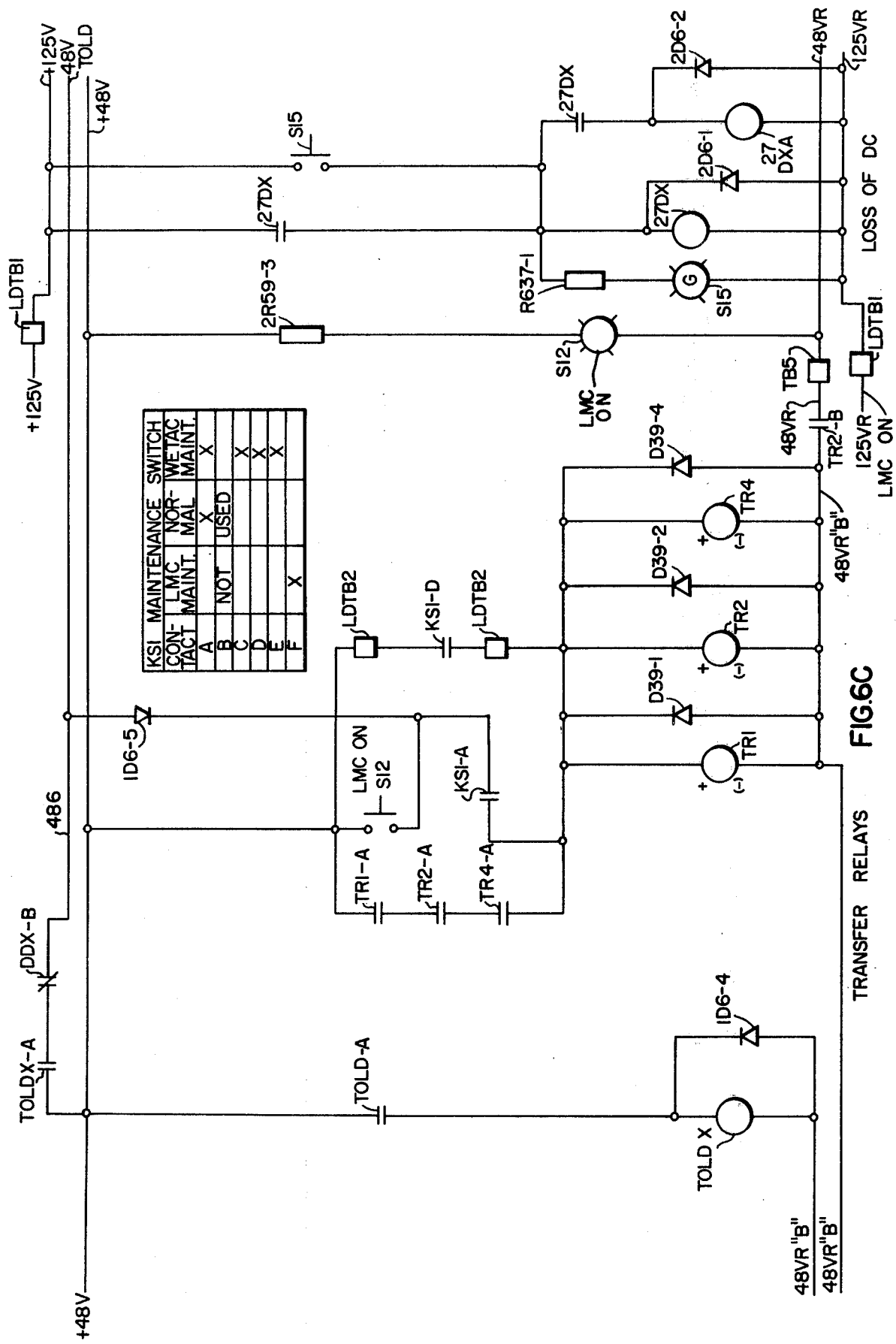
Figure 6D:
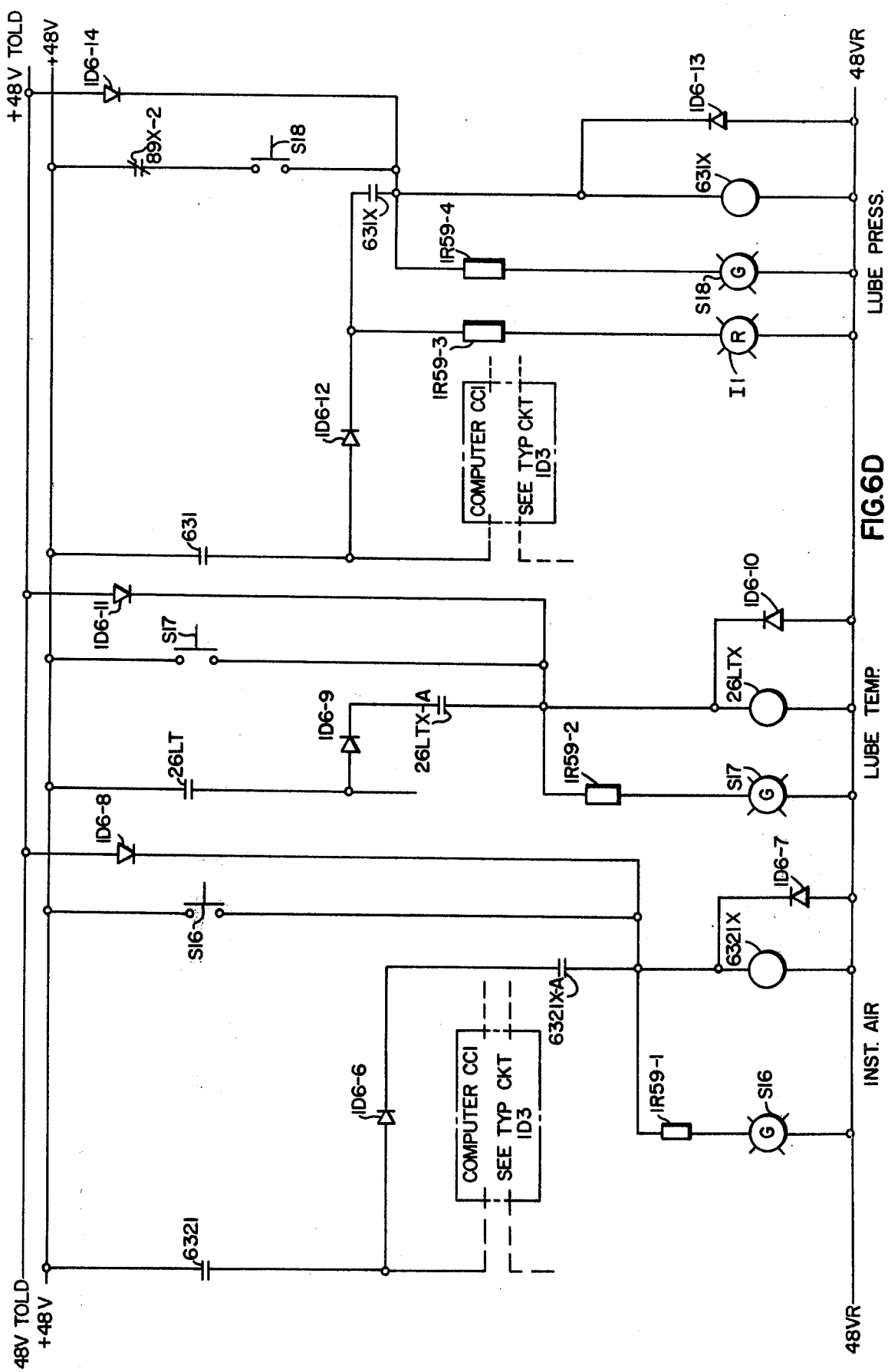
Figure 6E:
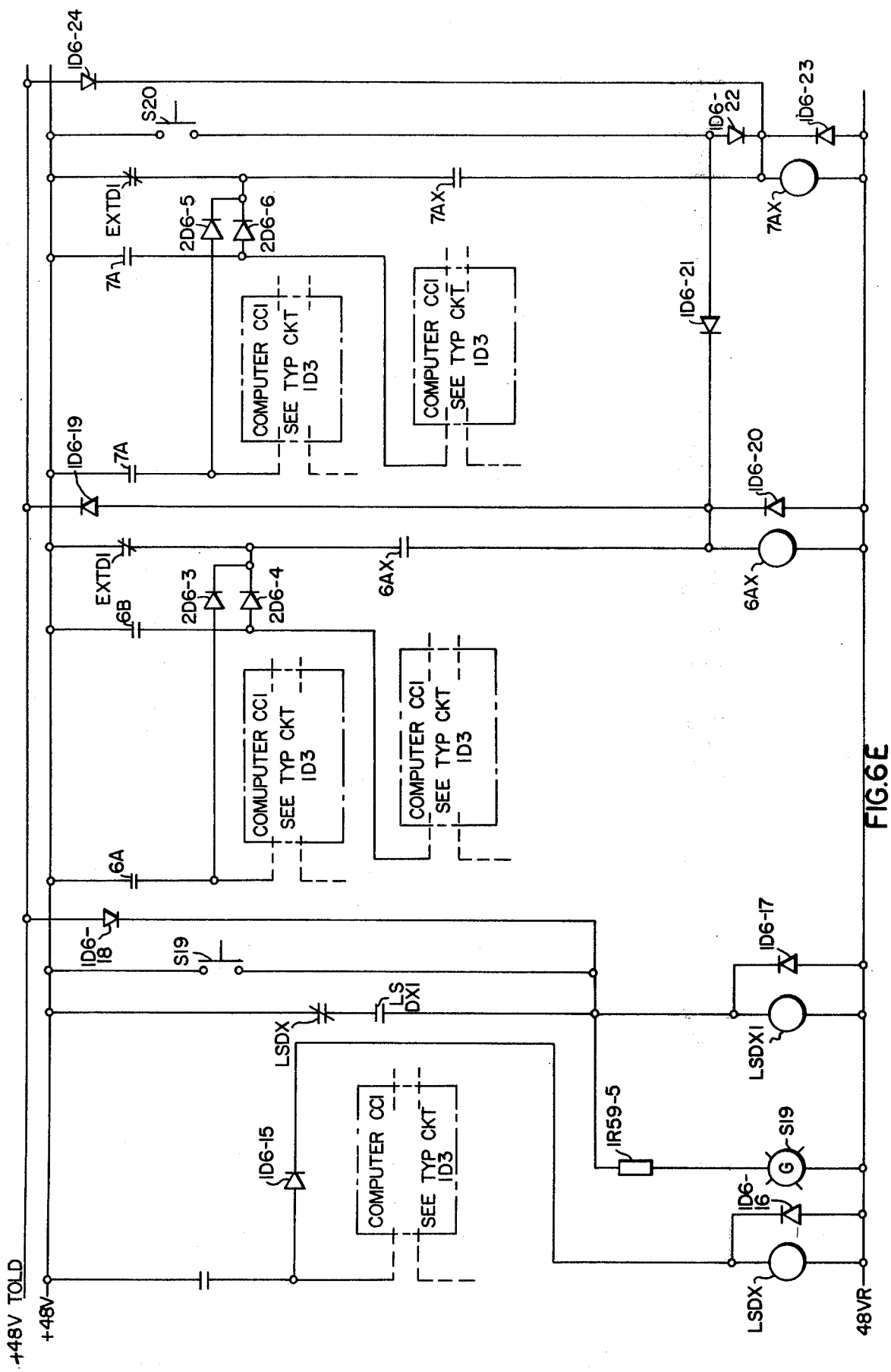
Figure 6F:
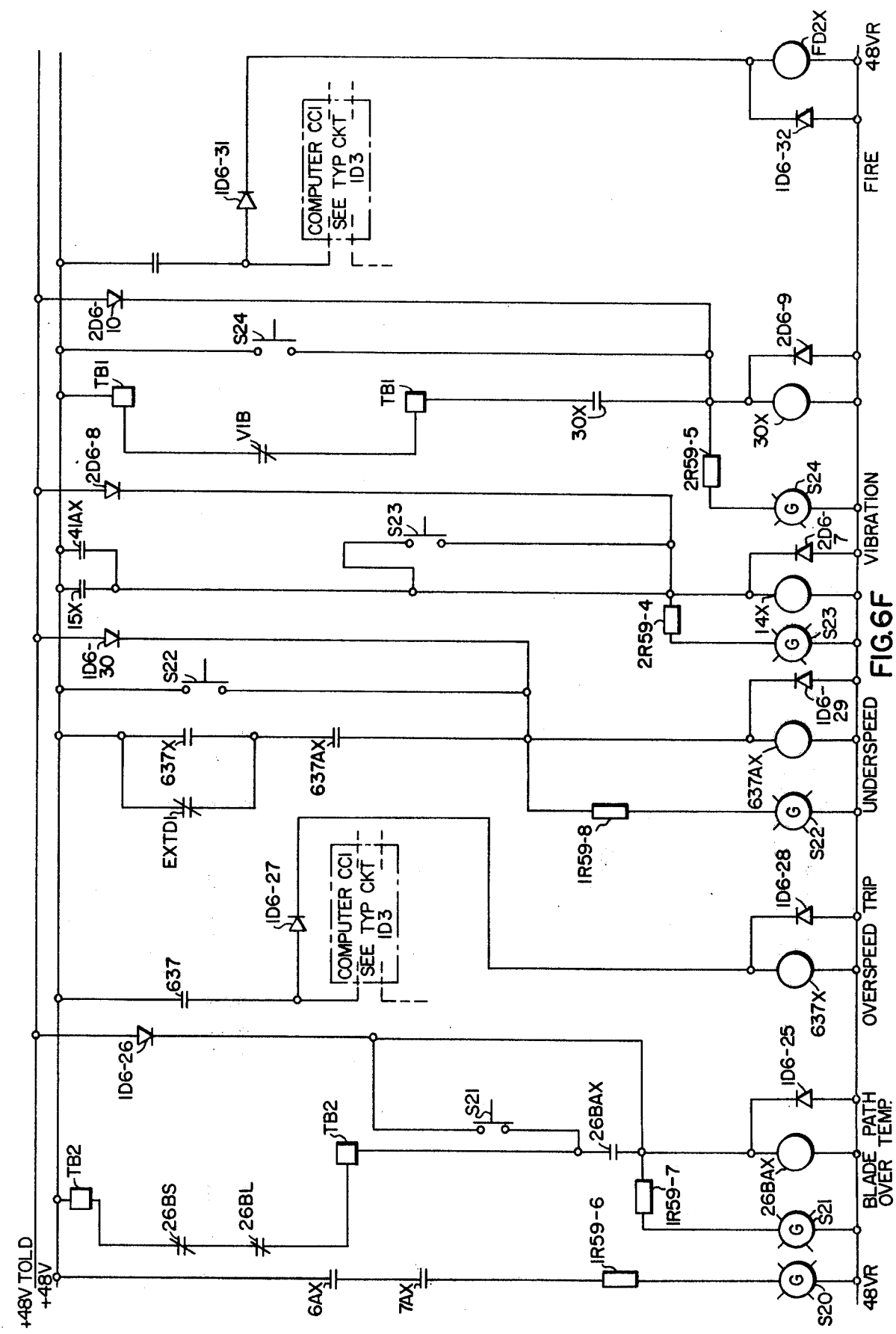
Figure 6H:
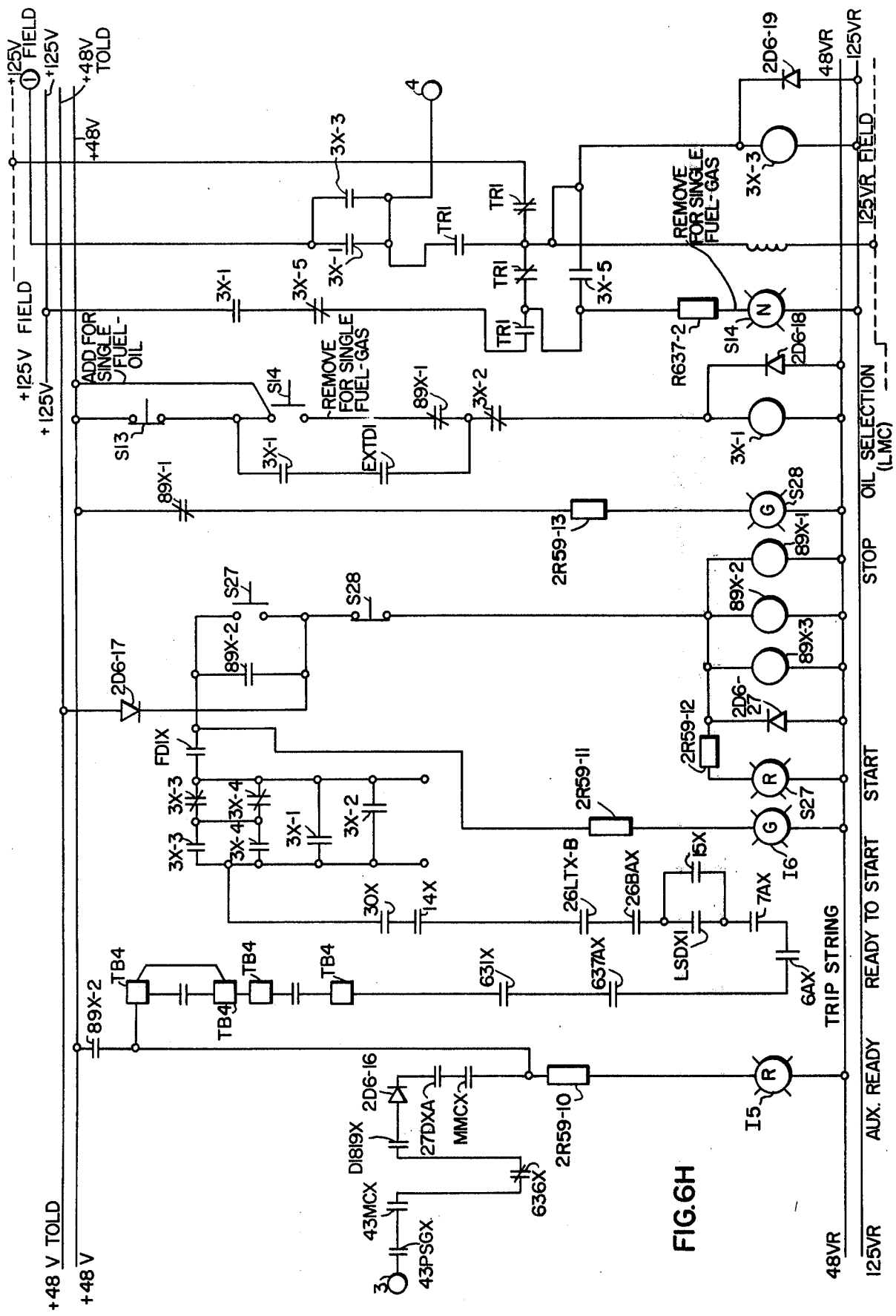
Figure 6I:
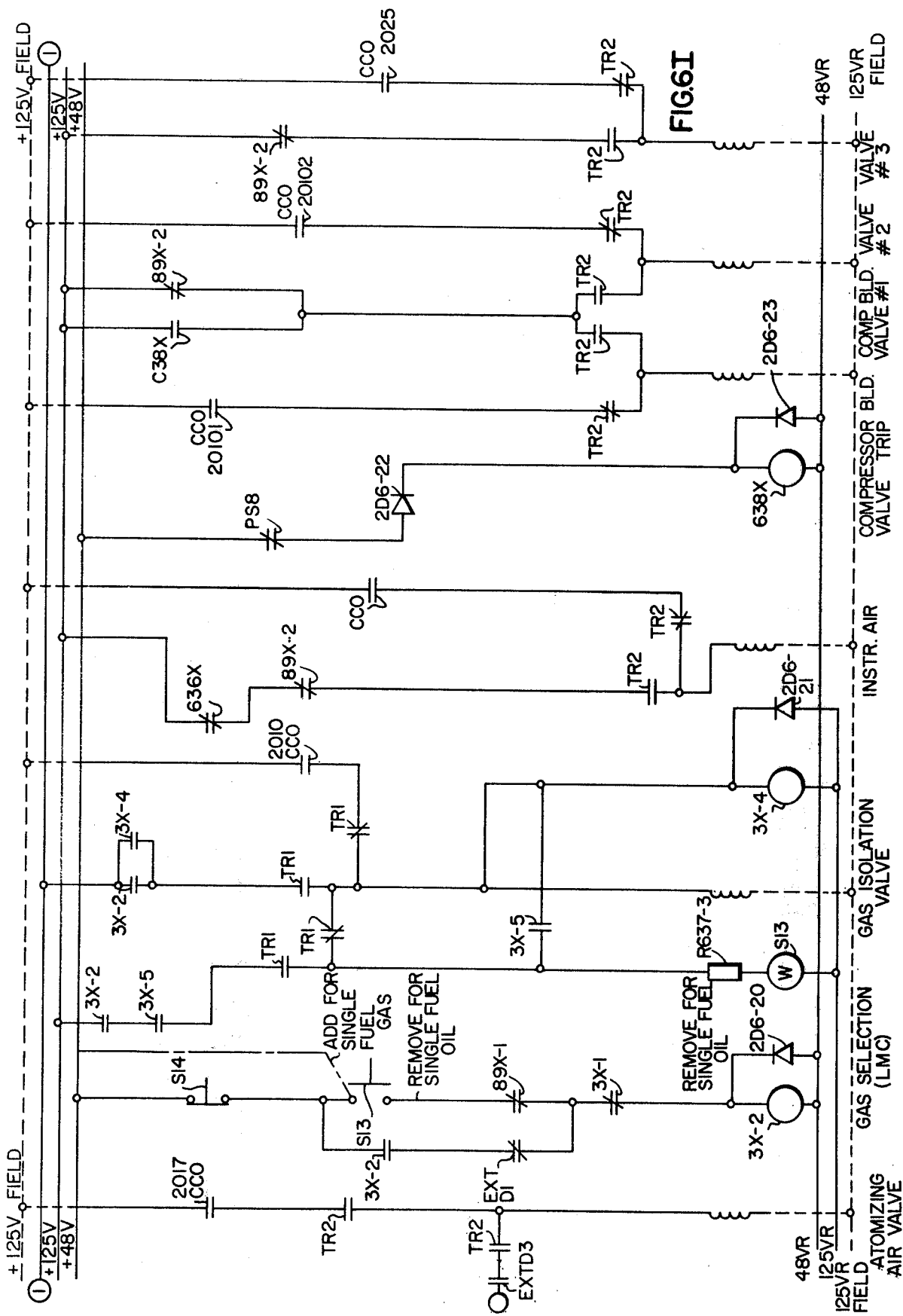
Figure 6K:
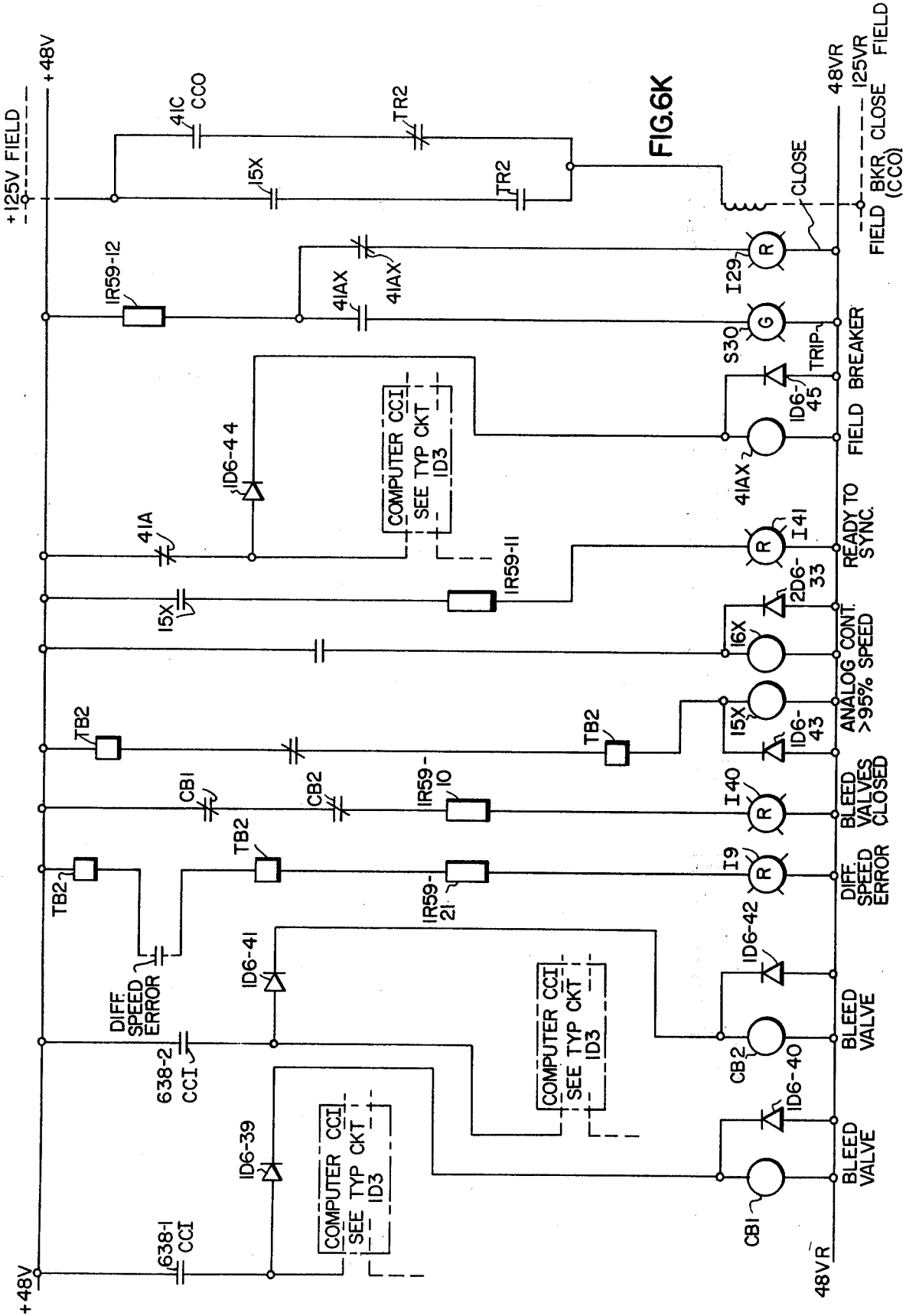
Figure 6M:
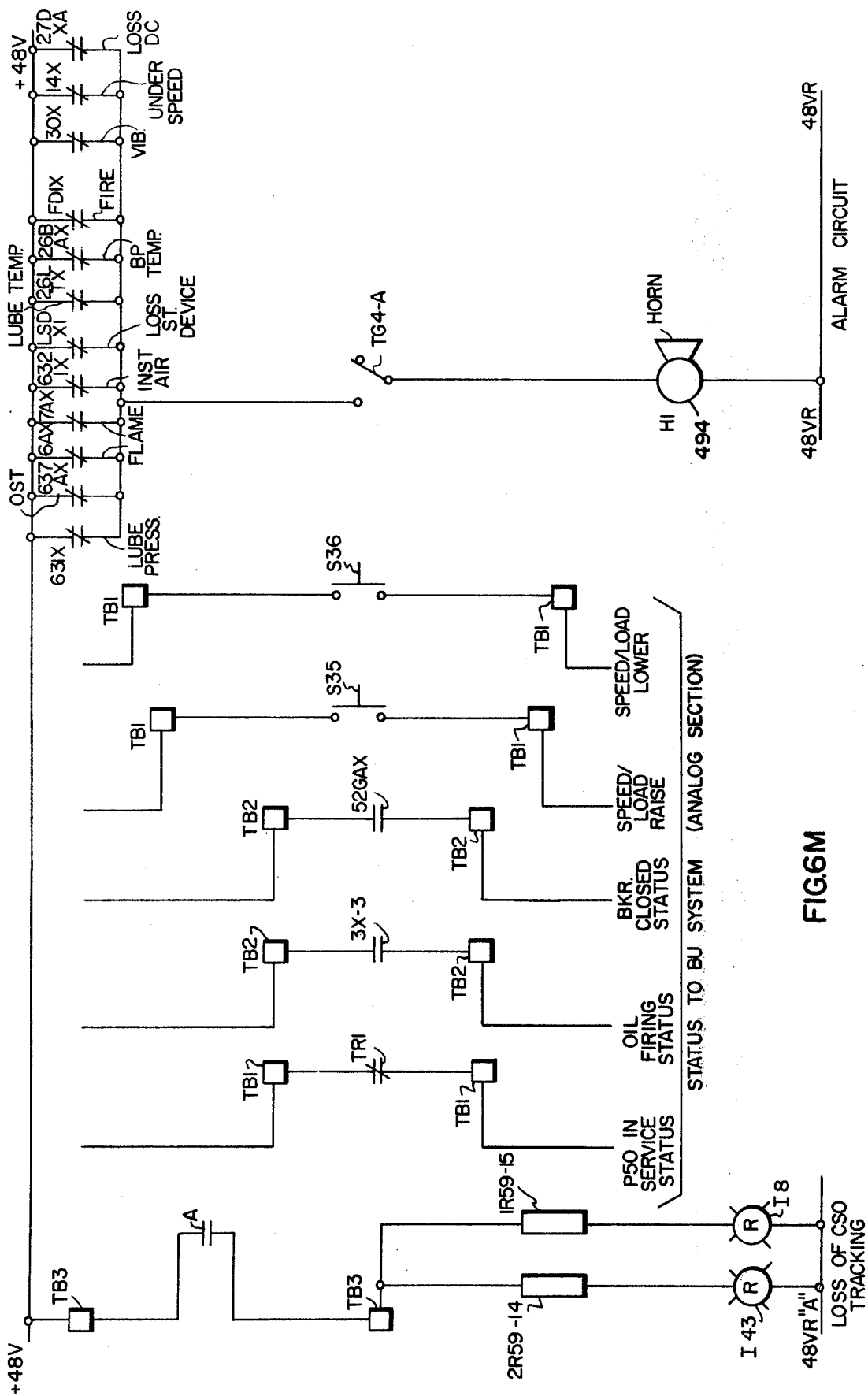
Figure 60:
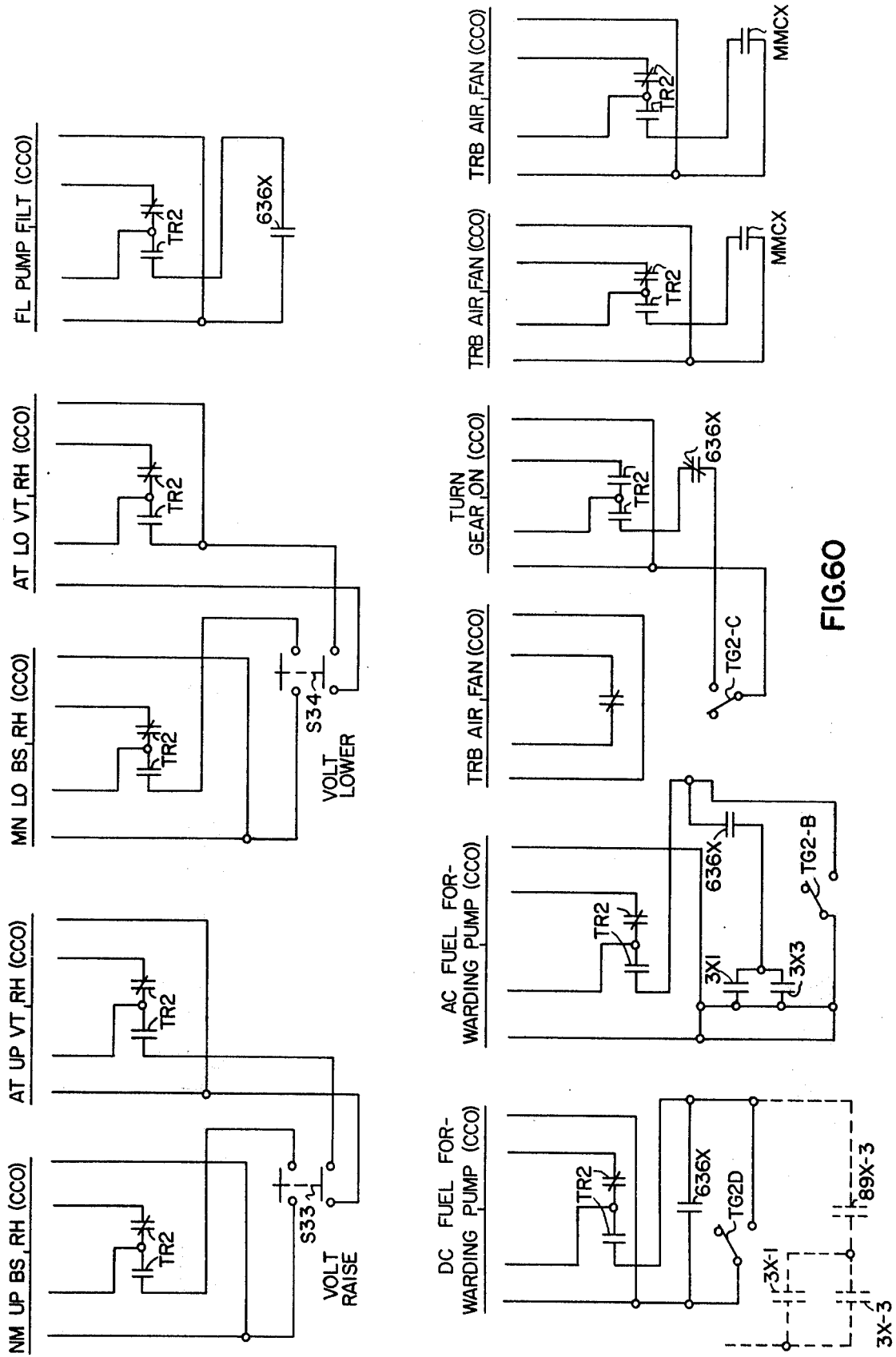
Figure 6P:
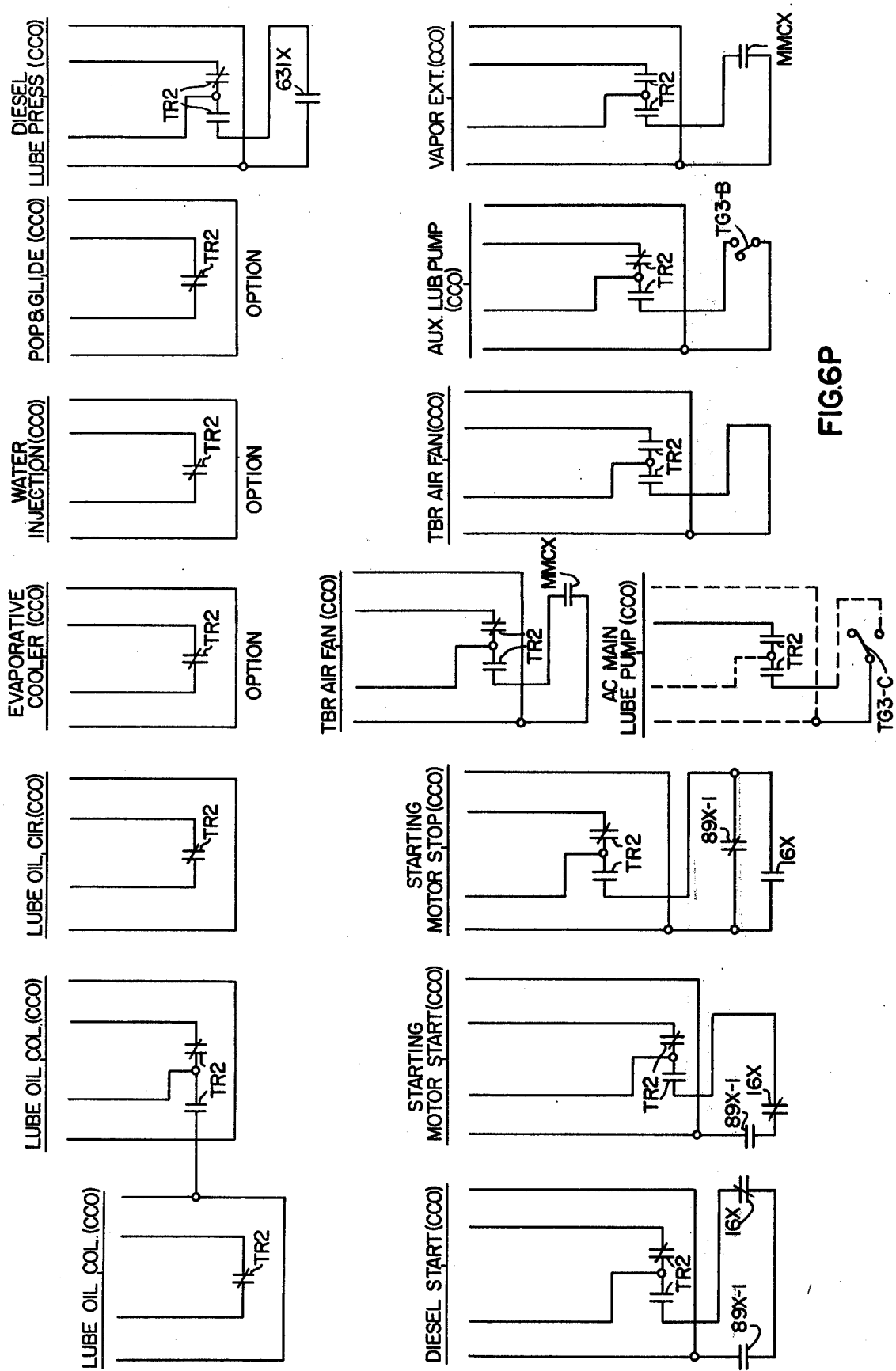
Figure 7A:
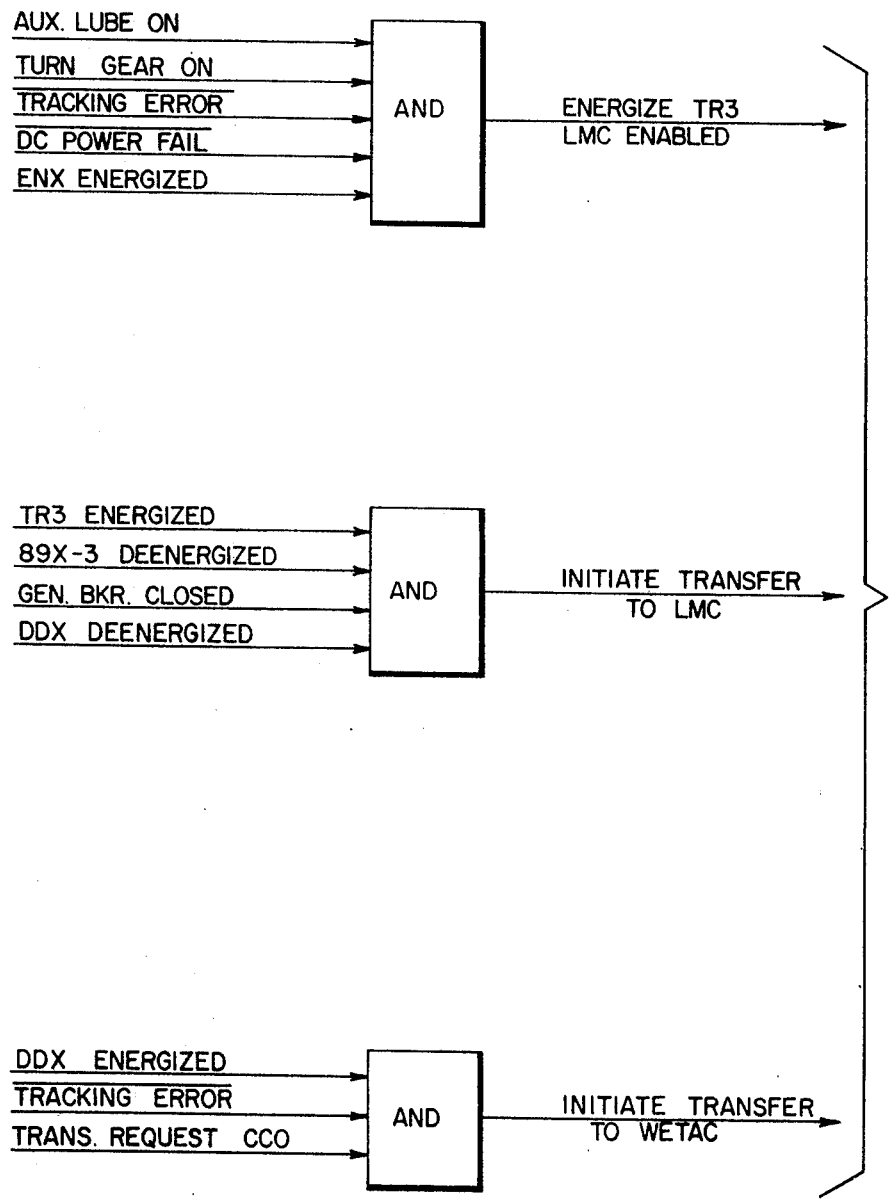
FIGS. 7A–B depict the relay blocks and action thereof used for transfer initiation and monitoring in the local maintenance controller.
Figure 7B:
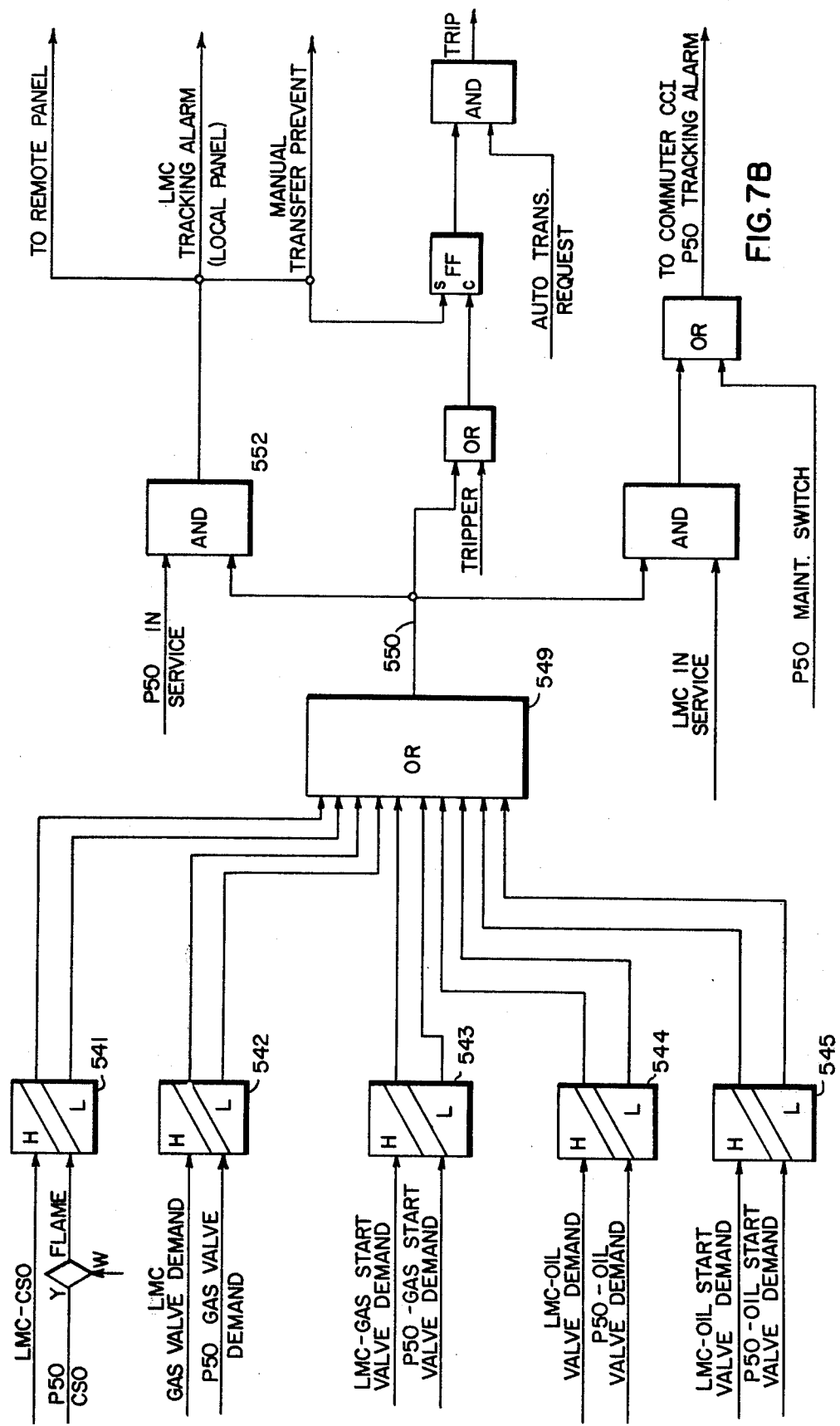

Referring first to FIGS. 4A-C, it can be seen that the LMC CSO (control signal output) is ultimately developed on line 401. This signal is then conveyed to the operator's panel 500 where it is amplified and forwarded to the appropriate fuel valve amplifier in the primary control system. An increase in LMC CSO will result in increased speed, while conversely, a decrease in that signal will result in lowered speed due to an increase or decrease in fuel flow. The LMC CSO is developed in the following manner.

AND gate 402 has four inputs thereto. Once the LMC mode of operation has been selected and a turbine start is contemplated thereunder, the LMC MODE and BREAKER OPEN (circuit breaker open) inputs to gate 402 are set to a logical high. If turbine speed is less than 95% of synchronous speed, the low speed signal monitoring block 420 sets a third input to gate 402 to a logical high. Once ignition has been achieved and recognized, the FLAME input to gate 402, its fourth and last input, is also set to a logical high. Thus, the output of gate 402 is set high, causing OR gate 403 to similarly set one of three inputs to AND gate 404. The other two inputs to gate 404, which indicate respectively that a speed decrease has not been called and that a speed increase permissive has been satisfied, are assumed to be at a logical high and so, the output of gate 404 causes the digital counter 405 to be incremented upwards at a rate determined by clock 421.

As will be noted by reference to FIG. 4C, clock 421 is able to increment the up/down counter 405 at one of four rates. These are (1) a tracking rate, (2) a loading rate, (3), a speed rate A and (4) a speed rate B. It should be noted that the particular clock rate selected for ramping the speed reference signal, which appears on line 408, is determined by the rate logic AND gates 431-433. AND gate 430 is utilized in clocking counter 405 at the predetermined loading rate. It should be further noted that the tracking rate is utilized to increment the counter 405 whenever the primary control system is, in fact, in control of the turbine or whenever, under LMC control, there is an absense of flame or pre-ignition. OR gate 434 responds to either of these conditions and sets the TRACKING STATE line 435 to a logical high should either occur.

In the tracking mode or state, the LMC CSO is held equal to the speed setpoint or reference minus the actual speed as measured by appropriate sensors previously identified. Thus, if at any time the actual speed experiences a sudden jump upwards, the LMC CSO will become negative until the speed setpoint or reference signal catches up. As previously noted, such an event actually occurs at ignition due to the fixed energy input resulting from the ignition process. Thus, with the turbine rotating at 20% speed, under the influence of the starting motor package, the sudden inflow of fuel via a fixed, minimum fuel valve setting and pressure typically yields a rapid, almost instantaneous, speed increase in the order of 30 to 40% of ignition speed.

This process is graphically illustrated in FIG. 19 which shows a speed vs. time curve for the turbine and related control effects. In time zone A, the LMC control is in the tracking mode until the turbine at point D reaches ignition speed. During time zone B, from point D to point E, the LMC remains in the tracking state as shall be hereinafter explained in greater detail. In this period, the tracking mode is continued and due to the relatively high tracking rate, the speed setpoint or reference signal catches up to the actual speed, i.e., the LMC CSO is driven to zero, since the turbine speed begins to flatten out. In time zone C, at point E, speed setpoint ramping is initiated and the turbine is accelerated towards 95% of synchronous speed.

If ramping of the speed setpoint signal is not delayed at ignition, a negative LMC CSO or fuel demand signal will occur because of the sharp increase in turbine speed. Since the period in which speed setpoint catches up to the actual turbine speed, under certain ambient conditions, may now exceed the atomizing air time, flameout could occur. This will, of course, delay placement of the turbine on-line and defeat the very reasons for having a local maintenance or backup controller or a control system which is designed to place a turbine on-line as quickly as possible.

This potential problem is solved by utilization of a signal time delay means 450 which is shown in FIG. 4C. A signal, "flame instant," is received from the turbine combustors, which signal verifies that ignition has taken place. This signal is fed to AND gate 451 and a 50 second time delay block 450. After expiration of the time delay period, one input to OR gate 452 is set to a logical high, which, in turn, sets line 453 to a logical high. The other input to AND gate 451 constitutes a signal indicative of turbine speed in excess of 60% of operational speed. Since this condition does not obtain at ignition speed levels, AND gate 451 has no affect on OR gate 452 until the turbine speed has been ramped up to greater than 60%. Line 453, the "flame control" line also appears in FIG. 4A and, as previously discussed, the lack of a logical high signal thereon is determinative of the operational state of the LMC.

Delay means 450 is selected to impart a 50 second delay to the "flame instant" signal, which delay retards commencement of the speed setpoint signal by that amount. The 50 second delay period has been selected in the preferred embodiment as a compromise between the time required for the speed setpoint signal to catch up with the actual measured speed and the time period in which ambient conditions may result in flameout. As can be seen from the graphical representation in FIG. 19, the increase in turbine speed resulting from the fuel input at ignition, levels off approximately at the end of 50 seconds. Consequently, at the tracking rate, the speed setpoint has caught up to the measured speed resulting in a zero CSO and permitting speed setpoint ramping to begin.

While the preferred embodiment has been specifically described in hardware form in a particular control environment, it will be appreciated that alternative embodiments thereof and equivalent modifications therein are possible and within the scope of the present invention. Consequently, the present invention is not intended to be limited to the precise embodiment described and shown herein, except as limited by any pertinent prior art.

I claim:

1. For a gas turbine power plant having a primary control system which develops a control signal output utilized to position fuel valve means and regulate fuel flow to the turbine, backup control apparatus comprising:
   a. input means for receiving information concerning predetermined plant operating parameters from the plant, including a signal indicative of the occurrence of a predetermined event;
   b. speed control means, including means for generating a speed setpoint signal, operably coupled to said input means for developing a speed error signal for use in positioning the fuel valve means adjusting fuel flow;
   c. means for incrementing said speed signal at a predetermined rate, operably coupled between said input means and said speed control means, after said predetermined event has occurred;
   d. time delay means, operably coupled between said means for incrementing and said input means, for delaying said signal indicative of said predetermined event by a predetermined period of time; and
   e. means for holding the fuel valve means position substantially fixed during the time delay.

2. The apparatus according to claim 1 wherein said means for incrementing comprises:
   a. first circuit means for incrementing said speed setpoint signal at a first rate before the occurrence of said predetermined event; and
   b. second circuit means for incrementing said speed setpoint signal at a second rate after the occurrence of said predetermined event;
   said time delay means being coupled between said second circuit means and said input means.

3. The apparatus according to claim 2 wherein said predetermined event comprises turbine ignition.

4. Apparatus for positioning fuel valve means and controlling fuel flow to a turbine including:
   a. input means for receiving information concerning predetermined turbine operating parameters, including a signal indicative of the occurrence of a predetermined event;
   b. speed control means, including means for generating a speed setpoint signal, operably coupled to said input means for developing a speed error signal for use in positioning the fuel valve means and adjusting fuel flow;
   c. means for incrementing said speed signal at a predetermined rate, operably coupled between said input means and said speed control means, after said predetermined event has occurred;
   d. time delay means, operably coupled between said means for incrementing and said input means, for delaying said signal indicative of said predetermined event by a predetermined period of time; and
   e. means for holding the fuel valve means position substantially fixed during the time delay.

5. The apparatus according to claim 4 wherein said means for incrementing comprises:
   a. first circuit means for incrementing said speed setpoint signal at a first rate before occurrence of said predetermined event; and
   b. second circuit means for incrementing said speed setpoint signal at a second rate after the occurrence of said predetermined event;
   said time delay means being coupled between said second circuit means and said input means.

6. The apparatus according to claim 5 wherein said predetermined event comprises turbine ignition.

7. A method of positioning fuel valve means and controlling the flow of fuel to the combustor portion of a gas turbine comprising the steps of:
   a. receiving information concerning predetermined turbine operating parameters, including a signal indicative of the occurrence of a predetermined event;
   b. generating a speed setpoint signal;
   c. comparing said speed setpoint signal to a signal related to actual turbine speed;
   d. developing an error signal as a result of comparing said speed setpoint signal and said turbine speed signal for use in positioning the fuel valve means;
   e. incrementing said speed setpoint signal at a predetermined rate after said predetermined event has occurred;
   f. delaying said incrementing step by a predetermined time period after said predetermined event has occurred; and
   g. holding the fuel valve means position substantially fixed during the time delay.

* * * * *